United States Patent
Ryu et al.

(10) Patent No.: US 10,697,871 B2
(45) Date of Patent: Jun. 30, 2020

(54) PARTICLE ISOLATION/ENRICHMENT USING CONTINUOUS CLOSED-LOOP MICRO-FLUIDICS

(71) Applicant: Massachusetts Institute of Technology, Cambridge, MA (US)

(72) Inventors: Hyunryul Ryu, Boston, MA (US); Kyungyong Choi, Cambridge, MA (US); Jongyoon Han, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 128 days.

(21) Appl. No.: 15/726,746

(22) Filed: Oct. 6, 2017

(65) Prior Publication Data

US 2018/0128723 A1 May 10, 2018

Related U.S. Application Data

(60) Provisional application No. 62/405,335, filed on Oct. 7, 2016.

(51) Int. Cl.
*B01L 3/00* (2006.01)
*G01N 1/40* (2006.01)
*G01N 15/10* (2006.01)

(52) U.S. Cl.
CPC ...... *G01N 1/4077* (2013.01); *B01L 3/502715* (2013.01); *B01L 3/502753* (2013.01); *B01L 3/502761* (2013.01); *G01N 15/1056* (2013.01); *B01L 3/502776* (2013.01); *B01L 2200/0631* (2013.01); *B01L 2200/0652* (2013.01); *B01L 2300/088* (2013.01); *B01L 2300/0864* (2013.01); *B01L 2300/0883* (2013.01); *G01N 2001/4088* (2013.01);

(Continued)

(58) Field of Classification Search
CPC .. B01L 3/502715; B01L 3/5027; B01L 3/502; B01L 3/50
USPC .......................................... 422/502, 500, 50
See application file for complete search history.

(56) References Cited

U.S. PATENT DOCUMENTS 9,789,485 B2    10/2017   Han et al.
2008/0128331 A1  6/2008   Lean et al.
(Continued)

FOREIGN PATENT DOCUMENTS

KR    20160064768 A    6/2016
WO    2011109762 A1    9/2011
(Continued)

OTHER PUBLICATIONS

Hou, H.W., et al., "Isolation and Retrieval of Circulating Tumor Cells Using Centrifugal Forces," Scientific Reports, vol. 3(1259): pp. 1-8 (Feb. 2013).

(Continued)

*Primary Examiner* — Christine T Mui
(74) *Attorney, Agent, or Firm* — Elmore Patent Law Group, P.C.; Carolyn Elmore; Mahreen Hoda

(57) ABSTRACT

The present invention encompasses a micro-fluidic system having a closed-loop configuration in which inertial micro-fluidic separation of particles and/or cells is continuously repeated by feeding part of the output back to the input so that the purity and/or concentration of the particles and/or cell is maximized. The invention also includes methods of using the micro-fluidic system.

35 Claims, 18 Drawing Sheets

Specification includes a Sequence Listing.

Single side recirculation – Particle-focusing-side outlet to inlet

(52) U.S. Cl.
CPC ............... *G01N 2015/1006* (2013.01); *G01N 2015/1081* (2013.01); *G01N 2015/1087* (2013.01)

(56) References Cited

U.S. PATENT DOCUMENTS

| | | | |
|---|---|---|---|
| 2011/0070581 A1 | 3/2011 | Gupta et al. | |
| 2011/0189150 A1 | 8/2011 | Bosch et al. | |
| 2014/0220617 A1 | 8/2014 | Yung et al. | |
| 2015/0238963 A1 | 8/2015 | Han et al. | |
| 2015/0293010 A1* | 10/2015 | Nagrath | B01L 3/502753 435/34 |
| 2016/0032350 A1* | 2/2016 | Hou | B01L 3/502753 435/30 |
| 2016/0199853 A1 | 7/2016 | Harwood et al. | |

FOREIGN PATENT DOCUMENTS

| | | |
|---|---|---|
| WO | 2013181615 A1 | 12/2013 |
| WO | 2014046621 A1 | 3/2014 |
| WO | 2014152643 A2 | 9/2014 |
| WO | 2015156876 A2 | 10/2015 |
| WO | 2016/044537 A1 | 3/2016 |
| WO | 2016044537 A1 | 3/2016 |
| WO | 2016044555 A1 | 3/2016 |
| WO | 2016077055 A1 | 5/2016 |

OTHER PUBLICATIONS

Nan, L., et al., "Emerging Microfluidic Devices for Cell Lysis: a Review," Lab on a Chip, vol. 14, pp. 1060-1073 (2014).
Gansler, T., et al., "Sixty Years of CA: A Cancer Journal for Clinicians," CA Cancer J. Clin., 60(6): pp. 345-350 (2010).
Mantovani, A., "Inflaming Metastasis," Nature 457(7225): pp. 36-37 (2009).
Khoo, B.L., et al., Genesis of Circulating Tumor Cells Through Epithelial-Mesenchymal Transition as a Mechanism for Distant Dissemination in Circulating Tumor Cells, Springer (2016).
Basik, M., et al., "Biopsies: Next-Generation Biospecimens for Tailoring Therapy," Nat. Rev. Clin. Oncology, vol. 10, pp. 437-450 (2013).
De Bono, J.S., et al., "Circulating Tumor Cells Predict Survival Benefit from Treatment in Metastatic Castration-Resistant Prostate Cancer," Clin. Cancer Res., 14(19): pp. 6302-6309 (2008).
Khoo, B.L., et al., "Short-Term Expansion of Breast Circulating Cancer Cells Predicts Response to Anti-Cancer Therapy," Oncotarget, 2015.
Nole, F., et al., "Variation of Circulating Tumor Cell Levels During Treatment of Metastatic Breast Cancer: Prognostic and Therapeutic Implications," Ann Oncol., 19(5): pp. 891-897 (2008).
Frisch, B., et al., "Bone Marrow Histology in Myelodysplastic Syndrome," Scand J. Haematol Supp., 45: pp. 21-37 (1986).
Whitesides, G.M., "The Origins and the Future of Microfludics," Nature 442(7101): pp. 368-373 (2005).
Bastos-Oreiro, M., et al., "Prognostic Impact of Minimal Residual Disease Analysis by Flow Cytometry in Patients with Acute Myeloid Leukemia Before and After Allogeneic Hemopoietic Stem Cell Transplantation," Eur. J. Haematol, 93(3): pp. 239-246 (2014).
Warkiani, M.E., et al., "Ultra-Fast Label-Free Isolation of Circulating Tumor Cells from Blood Using Spiral Microfluidics," Nat. Protoc., 11(1): pp. 134-148 (2016).
Warkiani, M.E., et al., "Slanted Spiral Microfludics for the Ultra-Fast, Label-Free Isolation of Circulating Tumor Cells," Lab on a Chip 14(1): pp. 128-137 (2014).
Warkiani, M.E., et al., "Malaria Detection Using Inertial Microfluidics," Lab Chip 15(4): pp. 1101-1109 (2015).
Nima, Z.A., et al., "Circulating Tumor Cell Identification by Functionalized Silver-Gold Nanorods with Multicolor, Super-Enhanced SERS and Photothermal Resonances," Sci Rep., vol. 4, p. 4752 (2014).
Nagrath, S., et al., "Isolation of Rare Circulating Tumour Cells in Cancer Patients by Microchip Technology," Nature 450(7173): pp. 1235-1239 (2007).
Jing, T., et al., Jetting Microfluidics with Size-Sorting Capability for Single-Cell Protease Detection, Biosens Bioelectron, vol. 66, pp. 19-23 (2015).
Buccisano, F., et al., "Prognostic and Therapeutic Implications of Minimal Residual Disease Detection in Acute Myeloid Leukemia," Blood 119(2): pp. 332-341 (2012).
Amin, H.M., et al., "Having a Higher Blast Percentage in Circulation Than Bone Marrow: Clinical Implications in Myelodysplastic Syndrome and Acute Lymphoid and Myeloid Leukemias," Leukemia 19(9): pp. 1567-1572 (2005).
U.S. Appl. No. 15/726,710, filed Oct. 6, 2017, titled "Liquid Biopsy Detection of Leukemia Using Closed-Loop Microfluidics" Khoo, et al.

* cited by examiner

Continuous membrane-less filtration of inertial-focused particle

Dual closed-loop recirculation – suspension fluid exchange

Exchange of buffer by dual closed-loop separation

SEQUENCE LISTING

<160> NUMBER OF SEQ ID NOS: 3

<210> SEQ ID NO 1
<211> LENGTH: 18
<212> TYPE: DNA
<213> ORGANISM: Artificial Sequence
<220> FEATURE:
<223> OTHER INFORMATION: Description of Artificial Sequence: Synthetic -continued

```
      primer

<400> SEQUENCE: 1
gaaggtgcag gtgccctg                                                        18

<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
gtstcgacga acgacgtacg                                                      20

<210> SEQ ID NO 3
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Ala Ala Ala Ala
1
```

PARTICLE ISOLATION/ENRICHMENT USING CONTINUOUS CLOSED-LOOP MICRO-FLUIDICS

RELATED APPLICATION

This application claims the benefit of U.S. Provisional Application No. 62/405,335 filed Oct. 7, 2016. The entire teachings of the above-referenced application are incorporated herein by reference.

GOVERNMENT SUPPORT

This invention was made with Government support under Grant Nos. U24 AI118656, R01 AI117043, and R21 AI119042 awarded by the National Institutes of Health. The Government has certain rights in the invention.

BACKGROUND OF THE INVENTION

The separation of nucleated cells from complex biological fluid is a critical step in disease diagnostics, for profiling genetic and other biomolecule signatures of the patient and for generating a patient-specific treatment strategy. Recently, the field of inertial micro-fluidics has shown promise for in separating cells from a biofluid with high processing rates [1]. An inertial micro-fluidics cell sorting system is a micro-fluidic device which separates cells of a specific size by utilizing the inertial forces that particles experience in a micro-fluidic channel. Particles inside the micro-fluidic channel experience different magnitudes of forces depending on their sizes. There are two major forces acting on particles inside the curved microchannel, one being the net lift force and the other being the Dean drag force. The net lift force ($F_N$) and the Dean drag force ($F_D$) are proportional to the fourth power and the first power of the particle diameter ($a_p$), respectively:

$$F_N = \rho G^2 C_L a_p^4,$$

$$F_D = 3\pi\mu U_{Dean} a_p = 5.4 \times 10^{-4} \pi\mu De^{1.63} a_p,$$

where $\rho$ is the density of fluid medium, $G = U_{Max}/D_h$, where $U_{Max}$ is the maximum fluid velocity and $D_h$ is the microchannel hydraulic diameter, $C_L$ is the lift coefficient which is a function of the particle position across the channel cross-section and channel Reynolds number (Re), and De is Dean number which is given by $$De = \frac{\rho U_f D_h}{\mu} \sqrt{\frac{D_h}{2R}} = Re\sqrt{\frac{D_h}{2R}} \ [2]).$$

The balance between these two forces in the curved microchannel geometry determines the position of a particle of a specific size in a flow with specific flow velocity. Since different-sized particles are transported to different positions of the channel, they can be separated out by appropriate bifurcation at the channel outlet. Unlike other micro-fluidic-based cell separation methods, such as acoustic, electroosmotic, electrophoretic and magnetic separation methods, inertial micro-fluidics have simple flow-pump setups and require no additional treatment and have no effect on the target cell-of-interest. In addition, the use of spiral micro-fluidics for biosample preparation prior to cell-based downstream assay, e.g. ELISA, PCR, [2-4] and bacterial detection, has been reported [5].

There remains a need for a technique for the efficient isolation and/or enrichment of particles and/or cells, such as rare cells.

SUMMARY OF THE INVENTION

The present invention provides systems and method for efficient isolation and/or concentration of particles and/or cells by recirculation of the fluid within an inertial micro-fluidics cell sorting system.

The invention encompasses a micro-fluidic system comprising:
   a. At least one inlet reservoir;
   b. At least one output reservoir;
   c. A first curvilinear microchannel comprising a first inlet in fluid communication with an inlet reservoir, a first outlet in fluid communication with the inlet reservoir, and a second outlet in fluid communication with an output reservoir; wherein said curvilinear microchannel is configured to separate particles from a sample fluid comprising a mixture of particles;
   wherein the micro-fluidic system is configured to provide a closed loop recirculation of the sample fluid through the first curvilinear microchannel.

In certain aspects, the micro-fluidic system further comprises a second curvilinear microchannel disposed between (a) the first outlet of said first curvilinear microchannel and the inlet reservoir and in fluid communication therewith, (b) the second outlet of said first curvilinear microchannel and the output reservoir and in fluid communication therewith, or (c) the output reservoir and the inlet reservoir and in fluid communication therewith.

In yet additional aspects, the first curvilinear microchannel of the micro-fluidic system further comprises a second inlet, wherein the second inlet is in fluid communication with the output reservoir, wherein the output reservoir comprises a second background fluid, wherein the second background fluid is different from that of the sample fluid.

The invention also encompasses devices comprising the micro-fluidic system. In certain aspects, the device is a portable device.

The invention additionally encompasses methods of separating particles from a sample fluid, methods of concentrating particles from a sample fluid, methods of rare cell enrichment, and methods of suspending particles in a different background fluid than that of the sample fluid comprising the use of the micro-fluidic systems.

In certain aspects, the invention is a method of separating particles from a fluid comprising the steps of:
   a. introducing the sample fluid into an inlet reservoir of the micro-fluidic system,
   b. directing the sample fluid from the inlet reservoir into the first inlet of the first curvilinear microchannel, bifurcating the fluid into a first stream containing a first particle population to the first outlet and a second stream containing a second particle population to the second outlet, and
   c. directing the first stream to the inlet reservoir and directing the second stream to the output reservoir.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale emphasis instead being placed upon illustrating the principles of the invention.

FIG. 5 also includes a graph of cell density (cell number/13 ul) for the sample fluid before introduction in the micro-fluidic system, the collected sample at the IWL (Final) and the collected sample at the OWL (Waste).

DETAILED DESCRIPTION OF THE INVENTION

Figure 1:
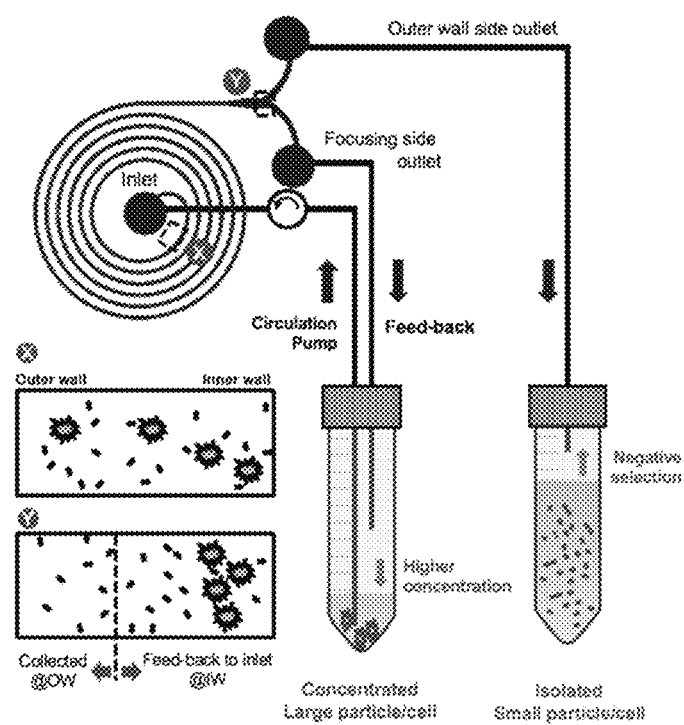
FIG. 1 is a schematic showing an inertial micro-fluidics system with a focusing-side outlet feedback loop. Large particles/cells can be concentrated, while small particles/cells can be collected and isolated from the large particles/cells.

A description of preferred embodiments of the invention follows.

As used herein, the words "a" and "an" are meant to include one or more unless otherwise specified. For example, the term "a cell" encompasses both a single cell and a combination of two or more cells.

The term "particle" or "particles" includes cells.

A "patient" is an animal to be treated or diagnosed or in need of treatment or diagnosis, and/or from whom a biofluid is obtained. The term "patient" includes humans.

The present invention includes a micro-fluidic system having a closed-loop configuration in which inertial micro-fluidic separation of particles and/or cells is continuously repeated by feeding part of the output back to the input so that the purity and/or concentration of the particles and/or cell is maximized. This invention allows particles and/or cells in samples of large volumes to be isolated and/or enriched for various downstream applications without affecting cellular viability.

The invention includes a micro-fluidic system comprising:
 a. At least one inlet reservoir;
 b. At least one output reservoir;
 c. A first curvilinear microchannel comprising a first inlet in fluid communication with an inlet reservoir, a first outlet in fluid connection with the inlet reservoir, and a second outlet in fluid communication with an output reservoir; wherein said curvilinear microchannel is configured to separate particles from a mixture of particles;
 wherein the microfluidic system is configured to provide a closed loop recirculation of separated particles through the first curvilinear microchannel.

As described above, the invention includes a micro-fluidic system comprising:
 a. At least one inlet reservoir;
 b. At least one output reservoir;
 c. A first curvilinear microchannel comprising a first inlet in fluid communication with an inlet reservoir, a first outlet in fluid communication with the inlet reservoir, and a second outlet in fluid communication with an output reservoir; wherein said curvilinear microchannel is configured to separate particles from a sample fluid comprising a mixture of particles;
 wherein the micro-fluidic system is configured to provide a closed loop recirculation of the sample fluid through the first curvilinear microchannel.

The micro-fluidic systems can comprise one or more curvilinear microchannels. The curvilinear microchannels can, for example, be spiral or serpentine. In certain aspects, the curvilinear microchannel is a spiral microchannel. As explained in more detail herein, particles can be collected from either the inlet reservoir or the outlet reservoir (depending on the particle population to be collected and/or the configuration of the system). The term "inlet reservoir" is used in the context of the reservoir from which fluid is introduced into the first inlet of the first curvilinear microchannel. The term "output reservoir" is used in the context of the reservoir into which fluid from at least one outlet of the first curvilinear microchannel is directed. In certain cases, the output reservoir can be used to collect waste and/or supernatant. As described in more detail herein, fluid in the output reservoir can also be directed to the microchannel by an inlet (e.g., a second inlet) in fluid communication with the outlet.

The invention also includes a method of separating particles from a sample fluid comprising a mixture of particles comprising the steps of:
 a. introducing the sample fluid into an inlet reservoir of the micro-fluidic system,
 b. directing the sample fluid from the inlet reservoir into the first inlet of the first curvilinear microchannel, bifurcating the fluid into a first stream containing a first particle population to the first outlet and a second stream containing a second particle population to the second outlet, and
 c. directing the first stream to the inlet reservoir and directing the second stream to the output reservoir;
wherein said first curvilinear microchannel is configured to separate particles from a sample fluid comprising a mixture of particles; and wherein the micro-fluidic system is configured to provide a closed loop recirculation of the sample fluid through the first curvilinear microchannel. A micro-fluidic system can be configured to provide closed loop recirculation of the sample fluid when fluid from one outlet (for example, the focusing side outlet or the inner wall outlet) is recirculated from the reservoir in fluid communication with the outlet (for example, the inlet reservoir) and the fluid is introduced back (e.g., by a circulation pump) to the inlet of the microchannel.

The micro-fluidic system can be configured to separate particles from a sample fluid, for example, by comprising a curvilinear microchannel with non-rectangular cross-sections. Micro-fluidic systems with non-rectangular cross-sections are described, for example, in WO2014/046621, the contents of which are incorporated by reference herein. By designing appropriate channel parameters, small particles/cells are trapped in the vortex at the outside of the microchannel wall (the outer wall) and larger particles focus along the inner microchannel wall. An example of a non-rectangular cross-section is a trapezoidal cross-section. For example, the curvilinear microchannel has a trapezoidal cross section defined by a radially inner side, a radially outer side, a bottom side, and a top side, the cross section having a) the radially inner side and the radially outer side unequal in height, or b) the radially inner side equal in height to the radially outer side, and wherein the top side has at least two continuous straight sections, each unequal in width to the bottom side. In certain aspects, the cross-section of the curvilinear microchannel has (a) the height of the radially inner side larger than the height of the radially outer side, or (b) the height of the radially inner side is smaller than the height of the radially outer side, or (c) the top side includes at least one step forming a stepped profile, or (d) the top side includes at least one shallow region in between the radially inner side and the radially outer side. In further aspect, the trapezoidal cross-section is a right trapezoidal cross section.

The invention encompasses separating particles by size and/or by deformability.

The invention includes separating particles from a mixture of particles based on particle size. The sample fluid is introduced into an inlet reservoir and then directed to an inlet of the curvilinear microchannel having a trapezoidal cross-section as described herein at a flow rate that isolates particles along portions of the cross-section of the microchannel based on particle size, wherein larger particles flow along the radially inner side of the microchannel to a first outlet and smaller particles flow along other portions of the microchannel to another other outlet, thereby size separating from the mixture. In some embodiments, the first outlet is located on the radially inner side of the microchannel and the first particle population (which is directed to the first outlet) is larger in size, dimension, and/or diameter than the second particle population. In yet additional aspects, the curvilinear microchannel comprises a third outlet.

As described herein, the systems and methods provide for recirculation of the sample fluid through the curvilinear microchannel, in some cases, a spiral microchannel. The sample fluid is cycled or passed through the curvilinear microchannel more than once. For example, the sample fluid (or the fluid in the inlet reservoir) can be passed through the curvilinear microchannel at least twice, at least three times, at least four times, at least five times, at least six times, at least seven times, at least eight times, at least nine times, at least ten times, or at least twenty times. The sample fluid (or the fluid introduced to the inlet reservoir) can be cycled or passed through the curvilinear microchannel until the desired level of concentration of particles is achieved and/or the desired volume of background fluid is directed to the other reservoir/collection tube, and/or the desired amount of larger particles are removed from the sample (and the smaller particles/cells are collected by negative selection).

In some aspects, the micro-fluidic system is characterized by single side recirculation wherein fluid from the particle focusing side outlet (collected in the inlet reservoir) is recirculated into the microchannel by a first inlet (see, for example, FIG. 1). The system shown in FIG. 1 comprises a spiral microchannel that concentrates inertial-focused particles (larger particles and/or cells) and negatively selects unfocused particles (smaller particles and/or cells). Specifically, the system comprises an inlet in fluid communication with an inlet reservoir and a first outlet and a second outlet, wherein the first outlet (referred to in FIG. 1 as the "focusing side outlet") of the spiral microchannel is in fluid communication with an inlet reservoir and the second outlet is in fluid communication with an output reservoir. The inlet in FIG. 1 is located at the interior of the spiral microchannel and the outlets are located at the circumference. The inlet reservoir in FIG. 1 feeds fluid from the inlet reservoir back to the spiral microchannel resulting concentration of the particles and/or cells. The microchannel focuses the stream comprising large particles and/or cells closer to the inner wall (compare inset X to inset Y in FIG. 1) and the stream from the inner wall is directed to the first outlet into the inlet reservoir where it is collected and further concentrated by recirculation (Inner wall outlet closed loop or IWL). The sample buffer that is part of the stream that is directed to the outer wall of the microchannel is directed to the second outlet (referred to in FIG. 1 as the "outer wall side outlet") which drains into the output reservoir. The micro-fluidic system is configured to provide closed-loop recirculation from the first outlet (the inner wall outlet) back to the microchannel. The feedback loop from the first outlet to the inlet reservoir also enables negative selection of small particles and/or cells. Small particles and/or cells that cannot form a focused stream and show spread stream in the microchannel can be directed to the second outlet (the outer wall side outlet) and into the output reservoir. Because small particles/and or cells are collected in the output reservoir, concentration and recovery of large particles and/or cells is possible by running the input sample until all or most of the sample fluid is consumed by recirculation.

The invention also encompasses a micro-fluidic system comprising a second curvilinear microchannel and methods of use thereof. The second curvilinear microchannel can, for example, be disposed between:
a) the first outlet of the first curvilinear microchannel and the inlet reservoir and in fluid communication therewith,
b) the second outlet of said first curvilinear microchannel and the output reservoir and in fluid communication therewith, or
c) the output reservoir and the inlet reservoir and in fluid communication therewith.

In certain embodiments, the second curvilinear microchannel is disposed between the output reservoir and the inlet reservoir and in fluid communication therewith. The second curvilinear microchannel can be a serpentine or a spiral microchannel. In certain embodiments, the first and second curvilinear microchannels are each spiral microchannels. In some embodiments, the second curvilinear microchannel has a trapezoidal cross section defined by a radially inner side, a radially outer side, a bottom side, and a top side, the cross section having a) the radially inner side and the radially outer side unequal in height, or b) the radially inner side equal in height to the radially outer side, and wherein the top side has at least two continuous straight sections, each unequal in width to the bottom side. In certain aspects, the cross-section of the second curvilinear microchannel has (a) the height of the radially inner side larger than the height of the radially outer side, or (b) the height of the radially inner side is smaller than the height of the radially outer side, or (c) the top side includes at least one step forming a stepped profile, or (d) the top side includes at least one shallow region in between the radially inner side and the radially outer side. In further aspect, the trapezoidal cross-section is a right trapezoidal cross section.

The invention additionally includes a method of separating particles from a sample fluid comprising a mixture of particles comprising the steps of:
a. Introducing the fluid into an inlet reservoir of the micro-fluidic system comprising the second curvilinear microchannel;
b. Directing the fluid from the inlet reservoir into the first inlet of the first curvilinear microchannel, bifurcating the fluid into a first stream containing the first particle population to the first outlet of the first curvilinear microchannel and a second stream containing a second particle population to the second outlet of the first curvilinear microchannel,
c. Directing the first stream back to the inlet reservoir,
d. Directing the second stream to the output reservoir to form a second fluid, wherein the output reservoir is in fluid communication with the inlet of the second curvilinear microchannel;
e. Directing the second fluid to the inlet of the second curvilinear microchannel, bifurcating the second fluid into a first secondary stream containing the first particle population to the first outlet of the second curvilinear microchannel and a second secondary stream containing the second particle population to the second outlet of the second curvilinear microchannel;
f Directing the second secondary stream back to the output reservoir; and
g. Directing the first secondary stream to the input reservoir;

wherein each of the curvilinear microchannels is configured to separate particles from a sample fluid comprising a mixture of particles; and wherein the micro-fluidic system is configured to provide a closed loop recirculation of the sample fluid through the first curvilinear microchannel. In certain aspects, the first and second curvilinear microchannels have trapezoidal cross-sections as described herein. In certain embodiments, the second outlet of the first curvilinear microchannel is located on the radially inner side of the first curvilinear microchannel and the second particle population is larger in size than the first particle population and/or the second outlet of the second curvilinear microchannel is located on the radially inner side of the second curvilinear microchannel and wherein the second particle population is larger in size than the first particle population.

Figure 2:
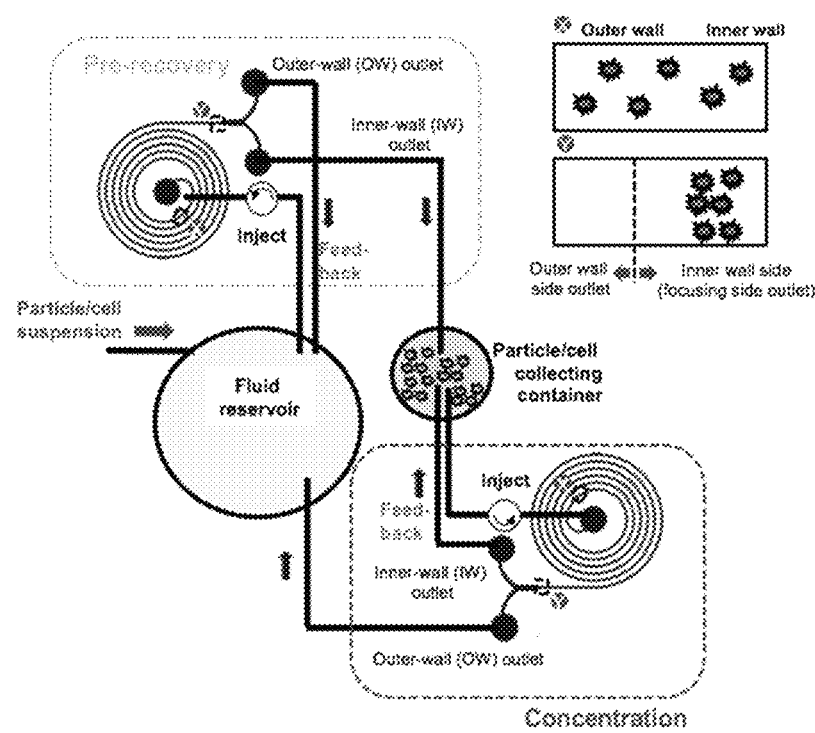
FIG. 2 is a schematic showing a continuous filtration platform using closed-loop inertial micro-fluidics. The outer wall side outlet recirculation (OWL) isolates large particles/cells to a container (the "fluid reservoir") while the focusing inner side wall outlet feedback (IWL) platform concentrates and minimizes supernatant.

Recovery of target cells can be maximized using a micro-fluidic system comprising a first curvilinear microchannel and a second curvilinear microchannel as described herein. An example of such a system and method is shown in FIG. 2. The system shown in FIG. 2 includes a feedback loop of the outer wall outlet closed-loop (OWL) to a fluid reservoir and a second microchannel that further focuses large particles/cells thereby increasing recovery of target cells. As shown in FIG. 2, the inner wall outlet (IWL) of the first microchannel is in fluid communication with a particle/cell collecting container which feeds into the inlet of the second microchannel. FIG. 2 shows a configuration of the micro-fluidic system wherein the OWL is arranged in sequence with the IWL wherein continuous filtration can be achieved. The fluid reservoir, which continuously takes in particles and/or cells, is connected to the OWL platform. The inner wall outlet of the OWL platform collects most of the target particles and/or cells and the stream from the inner wall outlet is directed to a particle/cell collecting container. Fluid from the particle/cell collecting container is directed to the IWL platform wherein background fluid from the outer wall outlet of the IWL platform that comprises particles and/or cells that were not collected in the particle/cell collecting container is directed to the fluid reservoir. The fluid reservoir then feeds back into the OWL platform increasing recovery of target particles and/or cells and minimizing the supernatant.

The invention also encompasses a micro-fluidic system wherein the first microchannel of the micro-fluidic system comprises a second inlet in fluid communication with a second inlet reservoir or in fluid communication with the output reservoir. Buffer or fluid exchange can be achieved by recirculating fluid through a system comprising two inlets and at least two outlets. In certain embodiments, the micro-fluidic system includes a first curvilinear microchannel which comprises a second inlet in fluid communication with the output reservoir, wherein the output reservoir comprises a second background fluid, wherein the second background fluid is different from the background fluid of the sample fluid. The second background fluid, can for example, be a buffer solution. The invention also includes a method of separating particles from a sample fluid comprising a mixture of particles and suspending the separated particles in a different background fluid than that of the sample fluid, the method comprising the steps of:
a. introducing the first fluid into the inlet reservoir of the micro-fluidic system, wherein the micro-fluidic system comprises a second inlet in fluid communication with the first curvilinear microchannel,
b. directing the fluid from the inlet reservoir into the first inlet of the first curvilinear microchannel, bifurcating the fluid into a first stream containing the first particle population to the first outlet of the first curvilinear microchannel and a second stream containing a second particle population to the second outlet of the first curvilinear microchannel,
c. directing the first stream back to the inlet reservoir,
d. directing the second stream to the output reservoir,
e. directing the fluid of the second stream in the output reservoir to the second inlet of the first curvilinear microchannel;

wherein the second particle population is suspended in a different background fluid than that of the sample fluid; and wherein the curvilinear microchannel is configured to separate particles from a sample fluid comprising a mixture of particles; and wherein the micro-fluidic system is configured to provide a closed loop recirculation of the sample fluid through the first curvilinear microchannel. The first curvilinear microchannel can have a trapezoidal cross-section as described herein.

Figure 3:
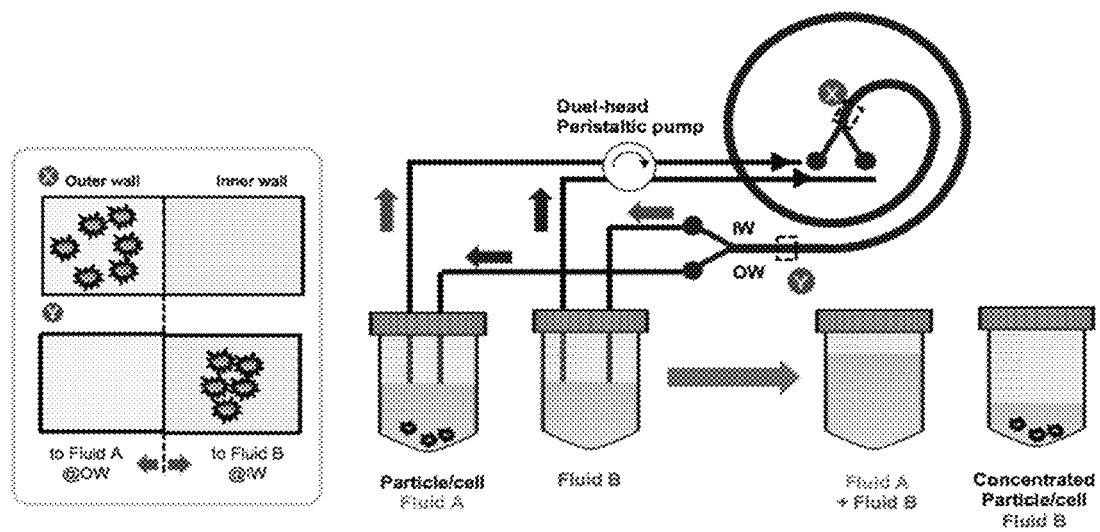
FIG. 3 is a schematic showing dual closed-loop recirculation micro-fluidics for suspension buffer exchange. Particles/cells from the original suspension migrate to the second fluid/medium through inertial micro-fluidics, while the second fluid/medium is not mixed with original medium. A concentrated suspension with the second fluid/medium could be achieved by changing bifurcation ratio of the outlets. By changing the bifurcation ratio of the outlet, the flow rate of the IW and the OW outlets divide differently according to the ratio. For example, if the inlet has a 5:5 ratio and the outlet has IW:OW of 4:6; the volume of the second fluid/medium will diminish while particles/cells migrate. This provides concentrated particle/cell in the secondary fluid/medium.
Figure 4:
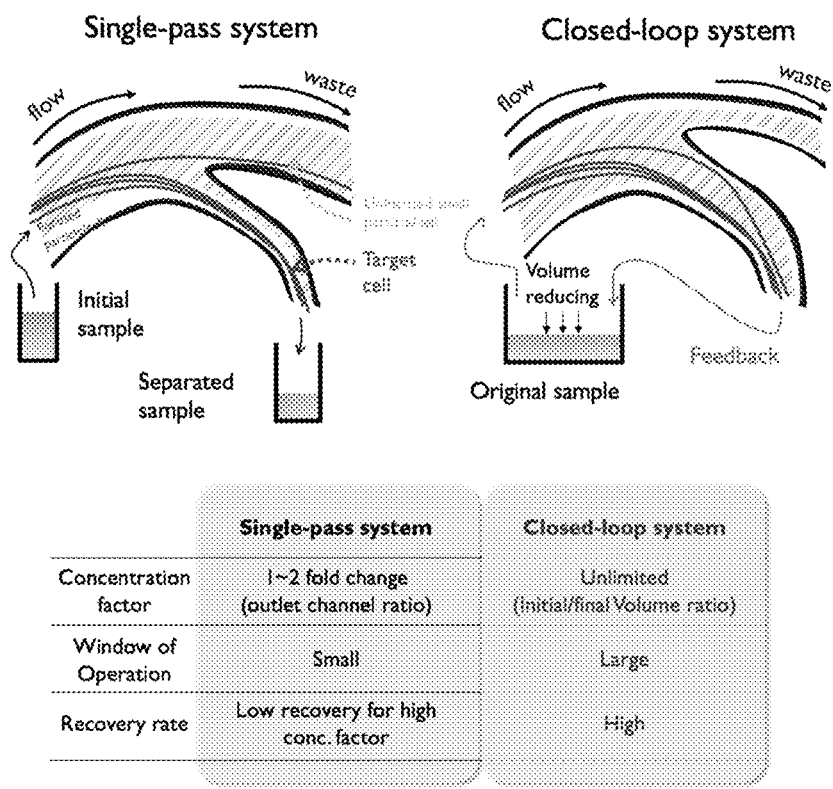
FIG. 4 is a drawing comparing features of a single-pass micro-fluidic separation system and a closed-loop micro-fluidics separation system.

By utilizing two feedback loops, IWL and OWL, focused particles and/or cells can migrate from the original suspension into a different fluid while not being mixed with the medium of the original suspension. FIG. 3 shows that Fluid A (comprising particles and/or cells) is pumped from a reservoir into a spiral microchannel by a first inlet wherein the stream from the inner wall outlet of the microchannel is fed into a reservoir comprising Fluid B, and the stream from the outer wall outlet is fed back to the reservoir comprising Fluid A. Fluid from Fluid B is recirculated into the microchannel by a second inlet in fluid communication with the microchannel. The two inlet/two outlet configuration results in suspension of the target particles and/or cells in a different fluid than that the fluid of the original suspension (in FIG. 3, the fluid of the original suspension is Fluid A). Concentrated suspension with new medium could be achieved by changing bifurcation ratio of the outlet.

The systems described herein comprise a first curvilinear microchannel which can comprise at least two outlets. In some aspects, the curvilinear microchannel comprises three outlets. In additional aspects, the curvilinear microchannel comprises two or more outlets, or three or more outlets.

Preferred micro-fluidics devices that can be used in the closed loop configurations of the present invention include those described in Lim et al., WO2011/109762A1; 9 Sep. 2011; Birch et al., WO 2013/181615; 5 Dec. 2013, Han et al., WO 2014/046621 A1; 27 Mar. 2014, Hou et al., WO 2014/152643 A1; 25 Sep. 2014; Voldman et al., WO 2015/156876 A2; 15 Oct. 2015; Warkiani et al., WO 2016/044537 A1; 24 Mar. 2016; Warkiani et al., WO 2016/044555 A1; 24 Mar. 2016; and Sarkar et al., WO 2016/077055 A1; 19 May 2016, which are each incorporated by reference in their entirety. In micro-fluidic devices, particles flowing in curvilinear channels are influenced by both inertial migration and secondary Dean flows. The combination of Dean flow and inertial lift results in focusing and positioning of particles at distinct positions for concentration and separation applications.

It is preferred that the curved micro-channels have non-rectangular cross-sections, thereby resulting in the alteration of the shapes and positions of the Dean vortices which generates new focusing positions for particles. For example, as described herein, a curved microchannel with a deeper inner side (along the curvature center) and a shallow outer side generates two strong Dean vortex cores near the inner wall, trapping all particles irrespective of size within the vortex.

Preferred flow rates can be in a range of between about 0.5 mL/min and about 1 L/min, such as between 0.5 mL/min and about 10 mL/min. In some aspects, multiple channels can be combined into a single micro-fluidic device. In other aspects, multiple channels can be combined into a multiplexed micro-fluidic device.

A curved micro-channel with a shallow inner side and a deeper outer side skews the vortex centers near the outer wall at the outer side and can entrain particles and cells within the vortex. However, larger particles with dominant inertial force are focused near the inner channel walls, similar to rectangular cross-section channels. Thus, by designing appropriate channel parameters, small particles/cells are trapped in the vortex at the outside wall, while relatively large particles focus along the inner microchannel wall. The threshold diameter determining whether a particle/cell is trapped within the Dean vortex or focused towards the inner channel wall is dependent on the flow rate. This enables a device to achieve good separation resolution between mixtures having a wide range of particle sizes. In aspects at least two outlets can be used for collection. A trapezoidal cross-section facilitates higher particle/cell concentrations.

Several types of curved channel (for example, spiral, serpentine, or arc) can be used. Spiral channels are preferred. Particles flowing in curved channels are influenced by both inertial force and Dean flow. The balance of these two effects can provide precise focusing and positioning of particles.

Fluid flowing through a channel with a laminar profile has a maximum velocity component near the centroid of the cross section of the channel, decreasing to zero near the wall surface. In a curved channel, the fluid experiences centrifugal acceleration directed radially outward. Since the magnitude of the acceleration is proportional to quadratic velocity, the centrifugal force in the centroid of the channel cross section is higher than at the channel walls. The non-uniform centrifugal force leads to the formation of two counter-rotating vortices known as Dean vortices in the top and bottom halves of the channel. Thus, particles flowing in a curvilinear channel experience a drag force due to the presence of these transverse Dean flows. Under Stokes' law, the drag force will be proportional to the Dean velocity at that point and proportional to the diameter of the particle. In the absence of other dominating forces, the Dean drag force will drive particles along the direction of flow within the vortex and finally entrain them within the core. In high aspect ratio rectangular cross section channels, this motion can be observed by observing particles moving back and forth along the channel width between the inner and outer walls with increasing downstream distance when visualized from the top or bottom.

Apart from the Dean drag force, larger cells with diameters comparable to the micro-channel dimensions also experience appreciable inertial lift forces resulting in their focusing and equilibration along the channel walls. In micro-channels with curvilinear geometry, the interplay between the inertial lift force and the Dean drag force reduces the equilibrium positions to just two near the inner channel wall at low flow rate, and move outward with an increase in flow rate, each within the top and bottom Dean vortex. The two equilibrium positions overlay each other along the micro-channel height and are located at the same distance from the micro-channel inner wall for a given cell size, i.e. viewed as a single position across the micro-channel width.

Spiral microchannels with trapezoidal cross sections are preferred. These channels are different from rectangular cross section, in that the maximum velocity is asymmetric along the channel cross-section resulting in the formation of stronger Dean vortex cores skewed towards the deeper channel side. These vortex cores have high probability to entrain particles within them. As shown herein, in a spiral channel with trapezoidal cross-section, the particle focusing behavior is different from that in a rectangular channel. In a trapezoidal channel, as shown in WO2014/046621, particles focus near the inner channel wall at low flow rate (similar to channels with rectangular cross-section), while beyond a certain threshold flow rate, they switch to an equilibrium position located at the outer half.

Along the depth direction, according to experimental measurements, particles are focused between about 25.5 to about 27.1% of the channel depth at flow rates of about 0.5 to about 3.0 mL/min. This result indicates that the distance between the focused particle and the channel wall in a trapezoidal channel in the depth direction is larger than that in the rectangular channel.

If the inner wall of the channel is deeper, strong Dean vortices will appear at the inner side, i.e., particles will be trapped near the inner side, even at high flow rates. Curved channels with this cross section can be used to collect a larger size range of particles at the inner side of the outlet and filtered particle free liquid at the outer side of the outlet, finding numerous applications in water filtration, for example. On the other hand, if the outer wall of the channel is deeper, Dean vortices are skewed towards the outer side. At the inner side, the Dean flow field is much like that in a rectangular channel. At certain flow rates, the larger particle can focus along the inner wall influenced by both Dean flow and inertial lift, while the smaller particles tend to get trapped in the vortex center at the outer side.

Two typical regimes of focusing are based on particle size, the inertial dominant and Dean dominant regimes. For small particles (e.g., 5.78 µm particles), the large channel dimension prevented them from focusing and these particles got trapped in the Dean vortex even at low flow rate. The larger particles (e.g., about 9.77 µm particles) also could not focus at the inner wall and were trapped within the Dean vortices at flow rates greater than or equal to about 1 ml/min. For example, 15.5 µm particles focused at the inner wall at low flow rates, about 1.5 ml/min, but transitioned from the inertial dominant regime to Dean dominant regime at about 2 ml/min. For the same microchannel, the 26.25 µm particles transitioned from the inertial regime to Dean regime at flow rates about 3 ml/min. From these results, at a flow rate of about 1.5 ml/min, particles >about 15.5 µm can be separated from smaller ones by collecting from the inner and outer outlets separately. Similarly, at a flow rate of about 2.5 ml/min, about 26.25 µm particles can be separated from a mixture of about 26.25 µm and about 15.5 µm particles. In some aspects, a low flow rate can be in a range of between about 0.5 mL/min and about 2 mL/min. Thus, a low flow rate can be a flow rate of about 0.5 mL/min, about 0.6 mL/min, about 0.7 mL/min, about 0.8 mL/min, about 0.9 mL/min, about 1.0 mL/min, about 1.1 mL/min, about 1.2 mL/min, about 1.3 mL/min, about 1.4 mL/min, about 1.5 mL/min, about 1.6 mL/min, about 1.7 mL/min, about 1.8 mL/min, about 1.9 mL/min, or about 2.0 mL/min.

Accordingly, in some aspects, the systems and methods include a set of curved micro-channels with non-rectangular cross-section that give rise to unique Dean vortices for varying applications in micro-fluidic field relating to particle focusing, separation, and mixing. In a particular aspect, the invention is directed to a micro-fluidic device that includes at least one inlet and a curvilinear microchannel having a trapezoidal cross section defined by a radially inner side, a radially outer side, a bottom side, and a top side, the cross section having a) the radially inner side and the radially outer side unequal in height, or b) the radially inner side equal in height to the radially outer side, and wherein the top side has at least two continuous straight sections, each unequal in width to the bottom side. The device further comprises at least two outlets. In certain aspects, a spiral channel with a trapezoidal cross-sections consisting of a shallow inner side and deeper outer wall is used.

The curvilinear microchannel can have a radius of curvature in a range of between about 2.5 mm and about 25 mm. For example, the curvilinear microchannel can have a radius of curvature of about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, or about 25 mm. The curvilinear microchannel can also have a length in a range of between about 4 cm and about 100 cm. For example, the curvilinear microchannel can have a length of about 5 cm, about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, or about 100 cm.

For a trapezoidal cross-section spiral microchannel, there are several factors that affect the focusing position and separation efficiency, such as the width of the microchannel, inner and outer depth of the microchannel cross-section, the radius of the spiral curvature, and the slant angle. The width can be in a range of between about 100 µm and about 2000 µm, such as a width of about 200 µm, about 300 µm, about 400 µm, about 500 µm, about 600 µm, about 700 µm, about 800 µm, about 900 µm, about 1000 µm, about 1100 µm, about 1200 µm, about 1300 µm, about 1400 µm, about 1500 µm, about 1600 µm, about 1700 µm, about 1800 µm, or about 1900 µm.

The outer depth can be in a range of between about 20 µm and about 200 µm, such as an outer depth of about 40 µm, about 60 µm, about 80 µm, about 100 µm, about 120 µm, about 140 µm, about 160 µm, or about 180 µm. The inner depth can be in a range of between about 20 µm and about 200 µm, such as an inner depth of about 40 µm, about 60 µm, about 80 µm, about 100 µm, about 120 µm, about 140 µm, about 160 µm, or about 180 µm. The radius of curvature can be in a range of between about 2.5 mm and about 25 mm, such as a radius of about 5 mm, about 7.5 mm, about 10 mm, about 12.5 mm, about 15 mm, about 17.5 mm, about 20 mm, or about 22.5 mm.

The slant angle is the angle between the top of the channel and the bottom of the channel. The slant angle can be in a range of between about 2 degrees and about 60 degrees. Thus, the slant angle can be about 2 degrees, about 4 degrees, about 6 degrees, about 8 degrees, about 10 degrees, about 12 degrees, about 14 degrees, about 16 degrees, about 18 degrees, about 20 degrees, about 22 degrees, about 24 degrees, about 26 degrees, about 28 degrees, about 30 degrees, about 32 degrees, about 34 degrees, about 36 degrees, about 38 degrees, about 40 degrees, about 42 degrees, about 42 degrees, about 46 degrees, about 48 degrees, about 50 degrees, about 52 degrees, about 54 degrees, about 56 degrees, about 58 degrees, or about 60 degrees. The slant angle of the channel affects the focusing behavior in two ways: (i) the threshold flow rate required to trap particles in the Dean vortex as a function of particle size and (ii) the location of the Dean vortex core. A large slant angle (i.e., in a range of between about 10 degrees and about 60 degrees) will lead to strong Dean at the outer side and increase the particle trapping capability. A large slant angle can also decrease the threshold flow rate required to trap particles of a given size within the Dean vortex.

The cross section of the channel can be characterized by a height of the radially inner side that is larger than a height of the radially outer side, or vice versa. In yet other aspects, the profile of the cross section can be stepped, curved, convex, or concave.

In other aspects, the radially inner side and the radially outer side of the trapezoidal cross section can have a height in a range of between about 20 microns (μm) and about 200 μm. Thus, the height of the radially inner side 210 can be about 20 μm, about 40 μm, about 60 μm, about 80 μm, about 100 μm, about 120 μm, about 140 μm, about 160 μm, about 180 μm, or about 200 μm, and the height of the radially outer side 220 can be about 20 μm, about 40 μm, about 60 μm, about 80 μm, about 100 μm, about 120 μm, about 140 μm, about 160 μm, about 180 μm, or about 200 μm. In some aspects, the height of the radially inner side 210 can be about 70 μm, or about 80 μm, or about 90 μm, and the height of the radially outer side 220 can be about 100 μm, or about 120 μm, or about 130 μm, or about 140 μm.

In certain aspects, the top side and the bottom side of the trapezoidal cross section can have a width in a range of between about 100 μm and about 2000 μm, such as a width of about 200 μm, about 300 μm, about 400 μm, about 500 μm, about 600 μm, about 700 μm, about 800 μm, about 900 μm, about 1000 μm, about 1100 μm, about 1200 μm, about 1300 μm, about 1400 μm, about 1500 μm, about 1600 μm, about 1700 μm, about 1800 μm, or a width of about 1900 μm.

Spiral microchannels can comprise one or more loops. In certain aspects, the multi-loop microchannel can be a 2 loop microchannel, a 3 loop microchannel, a 4 loop microchannel a 5 loop microchannel, a 6 loop microchannel, a 7 loop microchannel, an 8 loop microchannel, a 9 loop microchannel, a 10 loop microchannel, etc. The device can, for example, be an 8-loop spiral microchannel with one inlet and two outlets with a radius of curvature decreasing from about 24 mm at the inlet to about 8 mm at the two outlets for efficient cell migration and focusing. The width of the channel cross-section can be about 600 μm and the inner/outer heights can be about 80 μm and about 130 μm, respectively, for the trapezoid cross-section.

A variety of particles can be separated using the micro-fluidic devices described herein. In a particular aspect, larger particles can be separated from smaller particles. In certain aspects, larger particles can have a diameter from about 18 μm to about 50 μm. For example, larger particles can have a diameter of about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, or about 50 μm. In certain aspects, smaller particles can have a diameter from about 2 μm to about 14 μm. For example, smaller particles can have a diameter of about 2 μm, about 3 μm, about 4 μm, about 5 μm, about 6 μm, about 7 μm, about 8 μm, about 9 μm, about 10 μm, about 11 μm, about 12 μm, about 13 μm, or about 14 μm. In a particular aspect, the flow rate can be about 2.5 mL/min, the larger particles have a diameter in a range of between about 18 μm and about 40 μm, and the smaller particles can have a diameter in a range of between about 10 μm and about 20 μm. In another particular aspect, the flow rate can be about 1.5 mL/min, the larger particles can have a diameter in a range of between about 15 μm and about 25 μm, and the smaller particles can have a diameter in a range of between about 5 μm and about 10 μm. In still another particular aspect, the flow rate can be in a range of between about 2.5 mL/min and about 3.0 mL/min, the larger particles can have a diameter in a range of between about 25 μm and about 40 μm, and the smaller particles can have a diameter in a range of between about 5 μm and about 15 μm.

In some aspects, the particles can be cells, such as stem cells. In another aspect, the cells can be present in a biological fluid (e.g., blood, urine, lymph, cerebrospinal fluid, and the like). In a particular aspect, the cells are present in a blood sample, wherein the larger cells are circulating tumor cells (CTCs), and the smaller cells are hematologic cells. In some aspects, the CTCs are cancer cells (e.g., metastatic cancer cells) from a (one or more) breast cancer, colorectal cancer, kidney cancer, lung cancer, gastric cancer, prostate cancer, ovarian cancer, squamous cell cancer, hepatocellular cancer, nasopharyngeal cancer and other types of cancer cells. Because this approach does not require initial cell surface biomarker selection, it is suitable for use in different cancers of both epithelial and non-epithelial origin.

The methods described herein can further comprise collecting and isolating the separated particles, including cells, nucleic acids and proteins. In certain aspects, the method can further comprise downstream analysis such as immunostaining, qRT-PCR, FISH and sequencing. In a particular aspect, the method can further comprise conducting a heterogeneity study.

As will also be appreciated by those of skill in the art, the micro-fluidic device can further comprise other components upstream, downstream, or within a device. For example, one or more micro-fluidic devices can further comprise one or more collection devices (e.g., a reservoir), flow devices (e.g., a syringe, pump, pressure gauge, temperature gauge), analysis devices (e.g., a 96-well microtiter plate, a microscope), filtration devices (e.g., a membrane), e.g., for upstream or downstream analysis (e.g., immunostaining, polymerase chain reaction (PCR) such as reverse PCR, quantitative PCR), fluorescence (e.g., fluorescence in situ hybridization (FISH)), sequencing, and the like. An imaging system may be connected to the device, to capture images from the device, and/or may receive light from the device, in order to permit real time visualization of the isolation process and/or to permit real time enumeration of isolated cells. In one example, the imaging system may view and/or digitize the image obtained through a microscope when the device is mounted on a microscope slide. For instance, the imaging system may include a digitizer and/or camera coupled to the microscope and to a viewing monitor and computer processor.

In the systems and methods described herein, fluid can be introduced and recirculated into the micro-fluidic device in a variety of ways. In one aspect, fluid can be introduced into the micro-fluidic device using a syringe pump. In other aspects, fluid can be introduced into the micro-fluidic device using a piston pump, a gear pump, a peristaltic pump, a piezoelectric micropump, or using a controllable pressure regulator. The flow rate of fluid through the micro-fluidic device will vary depending on the use. In some aspects, the flow rate can be in a range of between about 0.5 mL/min and about 10 mL/min, such as a flow rate of about 1 mL/min, about 2 mL/min, about 3 mL/min, about 4 mL/min, about 5 mL/min, about 6 mL/min, about 7 mL/min, about 8 mL/min, or about 9 mL/min.

Micro-fluidic channels can be cast from a polymethylmethacrylate (PMMA) mold made by a precision milling process (Whits Technologies, Singapore). The patterns can be cast with Sylgard 184 Silicone Elastomer (PDMS) prepolymer mixed in a 10:1 ratio with the curing agent and cured under 80 C for 2 hours. After curing, the PDMS mold with patterns can be peeled and plasma bonded to another 3 mm thick PDMS layer. Input and output ports can be punched prior to bonding. For the observation of particle position from the side, the device can be cut along the output section of the channel with about 2 mm distance and then a second cast can be made by keeping the device vertical to a flat bottle container. Tubings can be connected to the ports before the second cast to prevent PDMS mixer flow into the channel.

Various fluids comprising mixtures of particles can be used in the systems and methods described herein. Examples of mixtures include biological fluids or biofluids (e.g., a biological sample such as blood, lymph, serum, urine, mucus, sputum, cervical fluid, placental fluid, semen, spinal fluid, and fluid biopsy), liquids (e.g., water), culture media, emulsions, sewage, etc. In embodiments in which the biofluid is whole blood, the blood can be introduced unadulterated or adulterated (e.g., lysed, diluted). Other biofluids can also be used unadulterated or adulterated (e.g., the biofluid can be pre-treated in some way or diluted). For example, methods of lysing blood are known in the art. In some aspects, the volume to volume concentration of the particles as compared to other cells can be less than about 5%. Thus, the volume to volume concentration can be about 4%, about 3%, or about 2%. In some aspects, dilution of blood sample can be to a hematocrit in a range of between about 0.5% and about 2%. Thus, the hematocrit of a diluted blood sample can be about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2%.

Inertial micro-fluidics have been shown to separate cells from biofluids with high processing rates [1]. Specifically, spiral micro-fluidic systems have been demonstrated for biosample preparation for cell-based downstream assay, e.g. ELISA, PCR, [2-4] and bacterial detection [5]. Yet, two remaining challenges of rare cell enrichment are achieving high purity and recovery. Since many of the target cells are of extremely low abundance (e.g. bloodborne pathogen, circulating tumor cells) in the low volume of patient-derived of fluid, high recovery and pre-concentration is necessary. At the same time, background cells and molecules, which often interfere with downstream biochemical assays, need to be removed in order to achieve high purity and high specificity of downstream analysis. Previous methods are characterized by fundamental trade-offs between purity and recovery of separation. For example, achieving high recovery often compromises purity, especially when there is significant overlap between separated cell/molecule streams. Single-pass separation provides a small window of optimal separation, especially for patients' samples with unknown physical fluid characteristics (e.g. serum or mucus). Additional requirements with respect to the separation of biofluids are the need to process large volumes of diluted biofluid (for example, about 100 ml or more) as well as the need to minimize molecular background (i.e., replacing serum with well-characterized buffer), which interferes with downstream assays.

Therefore, in certain aspects, the invention is directed to a method of separating cells or a cell population from a biofluid comprising introducing the biofluid into an inlet reservoir of a micro-fluidic system described herein. In certain aspects, the method comprises the steps of:
  a. introducing the biofluid into an inlet reservoir of the micro-fluidic system,
  b. directing the sample fluid from the inlet reservoir into the first inlet of the first curvilinear microchannel, bifurcating the fluid into a first stream containing a first cell population to the first outlet and a second stream containing a second cell population to the second outlet, and
  c. directing the first stream to the inlet reservoir to form a concentrated fluid and directing the second stream to the output reservoir;

wherein the curvilinear microchannel is configured to separate cells or a cell population from the biofluid fluid; and wherein the micro-fluidic system is configured to provide a closed loop recirculation of the sample fluid through the first curvilinear microchannel. As described in detail above, the micro-fluidic system can be configured to separate particles form the sample fluid when the curvilinear microchannel has a trapezoidal cross-section. As described above, the biofluid can be pre-treated (for example, diluted) prior to introduction into the inlet reservoir. In certain aspects, the first cell population comprises larger cells than that of the second cell population, and the first outlet is located on the radially inner side of a spiral microchannel. In certain additional aspects, the first cell population is collected. In yet further aspects, the population of smaller cells is collected at the output reservoir. In certain additional aspects, the first or second cell population comprises rare cells. In some examples, the rare cells are cancer cells, pathogens (for example, bacteria and/or virus), leukocytes, and/or neutrophils. In certain aspects, the rare cells are a bloodborne pathogen. In yet additional aspects, the rare cells which represent the larger cell population (e.g., cancer cells, leukocytes, neutrophils) are collected from the reservoir into which the stream from the focusing side outlet is directed. In yet further aspects, the rare cells (e.g., bacteria and/or virus) are collected from the reservoir into which the other outlet (e.g., the outer wall outlet) is directed.

The present invention demonstrates a novel operating method of spiral micro-fluidics to enrich rare cells from the patient-derived sample, even if unit single pass separation step cannot provide ideal separation. By feeding the output stream of the separation back to original sample as described herein, and running continuously with high flow processing rate, one can achieve high pre-concentration, recovery, and purity of target cells. These methods can be miniaturized to a bench-top system with a good prospect to be useful in resource-limited field sites.

Unlike previous open-loop configurations where the volume of the output could only be determined by the bifurcation ratio or fluidic resistance ratio at the binary outlet, the closed-loop configuration described herein can provide a concentration factor as a function of the initial/final suspension volume ratio. This feature is not affected by the dimensions or structure of the microchannel, thus providing flexibility for micro-fluidic architecture. For example, a large inner wall (IW) outlet channel in a single-pass system that offers a high recovery ratio but a low concentration factor. However, in the inner wall loop (IWL) system (wherein there is a feedback loop from the inner wall outlet), the concentration factor is no longer a function of channel dimension and, as such, a large IW outlet can provide high recovery rate along with high concentration factor. Cells that are rare or present in a low amount in the sample can be concentrated while being suitable for downstream biological assay including, for example, enzymatic assay, PCR, cellular immune function assay, etc.

Figure 5:
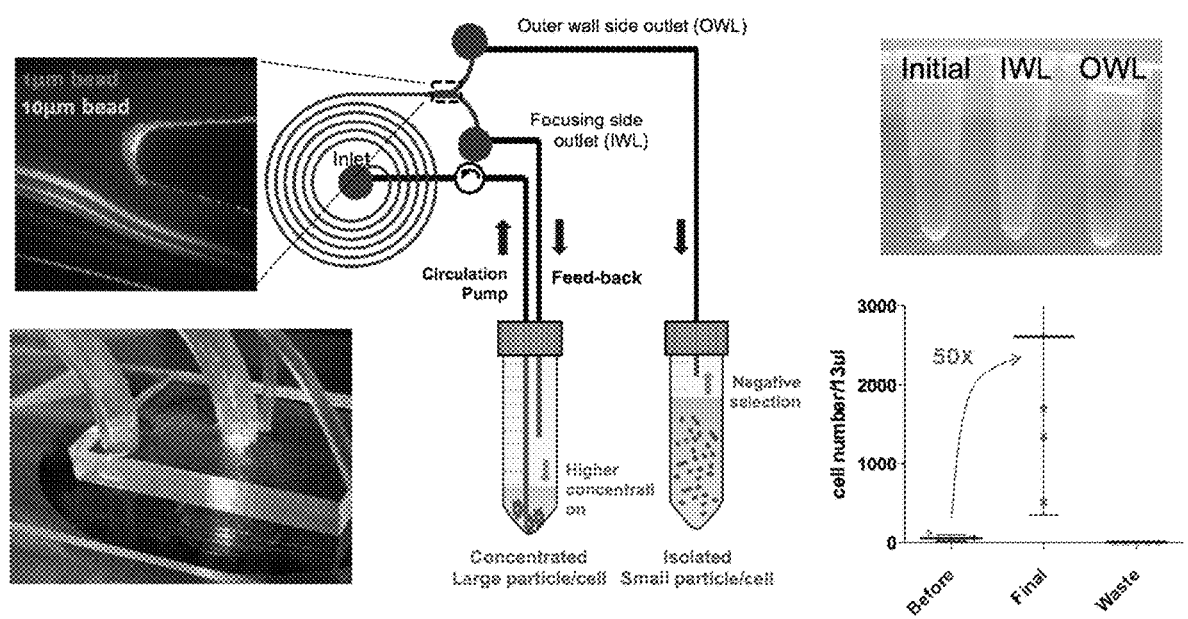
FIG. 5 shows experimental results using 1- and 10-micron fluorescent beads. The closed-loop spiral micro-fluidics system focused the 10-micron particles (Green) to go to the inner wall loop (IWL) where they are recirculated. The background fluid containing the unfocused 1-micron particles (Red) is directed to the outer wall loop (OWL) reservoir.

In certain aspects, the present invention allows small particles and/or cells to be isolated by negative selection. Even particles that are too small to be focused with inertial lift forces, such as bacteria, virus, or even proteins or nucleic acids, can be isolated by closed-loop configuration (See, for example, FIG. 5). As shown in FIG. 5, smaller particles are collected at the outer wall side outlet while larger particles/cells are collected at the focusing (inner wall) side outlet. By removing large particles or nucleated cells from the biofluid, isolated small particles/cells can collect and/or be isolated and optionally, run through downstream molecular assay thus minimizing the possibility of false-positive diagnostics. Therefore, in some embodiments, the invention is directed to a method of separating cells or a cell population from a biofluid by negative selection, the method comprising the steps of:
  a. introducing the biofluid into an inlet reservoir of the micro-fluidic system,
  b. directing the biofluid from the inlet reservoir into the first inlet of the first curvilinear microchannel, bifurcating the fluid into a first stream containing a first particle population to the first outlet and a second stream containing a second particle population to the second outlet,
  c. directing the first stream to the inlet reservoir and directing the second stream to the output reservoir; and
  d. collecting the second particle population from the output reservoir;
wherein the curvilinear microchannel is configured to separate particles from a sample fluid comprising a mixture of particles; and wherein the micro-fluidic system is configured to provide a closed loop recirculation of the sample fluid through the first curvilinear microchannel. In certain aspects, the first particle population comprises larger particles than that of the second particle population, and the first outlet is located on the radially inner side of a spiral microchannel and the second outlet is located on the radially outer side of the spiral microchannel. In certain additional aspects, the second particle population comprises bacteria cells, virus particles, proteins, and/or nucleic acids.

Thus the present invention can be used for the isolation and/or enrichment of rare particles or cells. The systems and methods, which include a one-step continuous isolation/enrichment of rare particles using inertial-based microfluidics, enables downstream assays, by boosting sensitivity sufficient to detect and phenotype rare cells. Such rare cells include cancer cells, pathogen, leukocytes and/or neutrophils. For example, the systems and methods can be used to detect cancer cells in a biofluid, to isolate pathogen from the blood of a patient, to isolate leukocytes from a small amount of blood, and/or to isolate neutrophils in pulmonary sputum.

Figure 7:
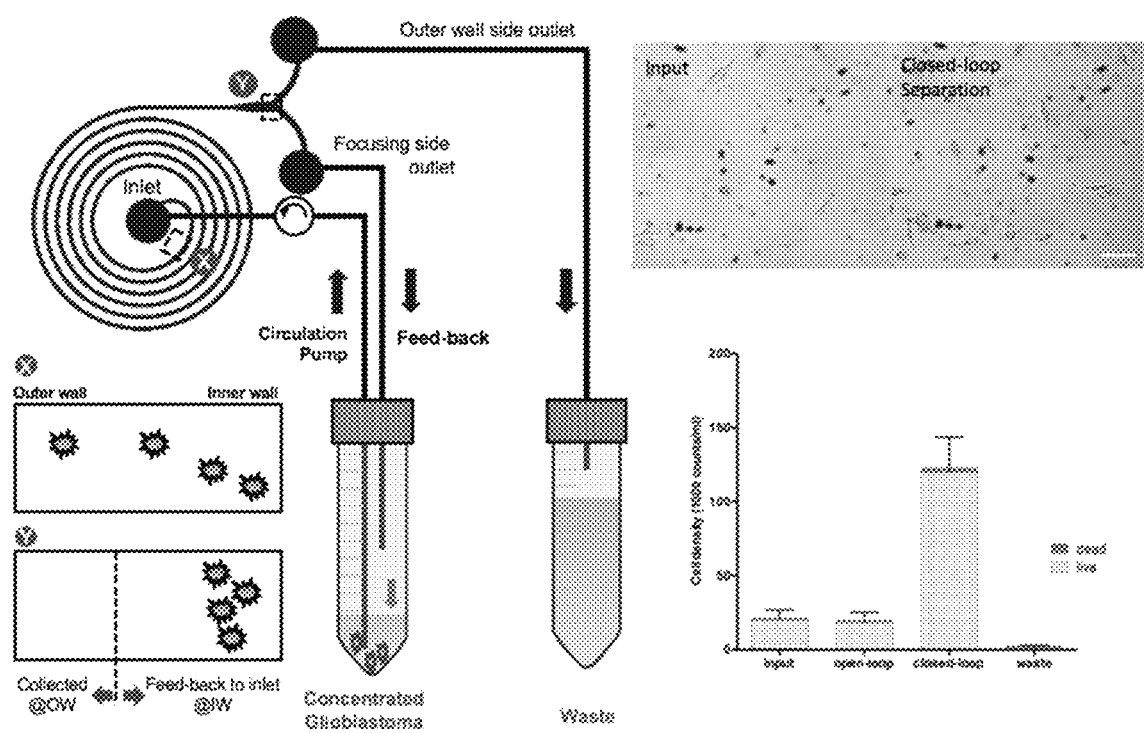
FIG. 7 shows experimental results for the enrichment of glioblastoma cells using the closed loop micro-fluidic system. Microscopic images of culture dishes show cell density after closed-loop separation as compared to initial cell density. Over 95% cells were recovered with a viability of 97.7%.

In certain aspects, the micro-fluidic system described herein can be used for enrichment of rare cancer cells from a biofluid, for example, from biofluid collected from a patient. Liquid biopsy is a relatively non-invasive technique, as compared to bone marrow biopsy, and is not associated with the risk or mortality. However, cancer cells in biofluids are usually present in extremely low density which can impede their detection and phenotyping using current diagnostics tools. The present invention enables cancer cells to be concentrated into a culturable range. See, for example, FIG. 7. This figure shows the experimental proof-of-concept of enrichment of glioblastoma cells using the closed loop micro-fluidic system described herein. As shown in FIG. 7, an inlet in fluid communication with a sample reservoir (the inlet reservoir) containing a fluid sample comprising glioblastoma cells introduces the fluid to a spiral microchannel. The inner wall outlet of the microchannel directs the stream from the inner wall of the microchannel back into the reservoir and the outer wall outlet directs the stream from the outer wall into the waste reservoir. The concentrated glioblastoma cells are collected from the inlet reservoir. FIG. 7 shows microscopic images of culture dishes showing cell density after closed-loop separation as compared to the initial cell density. Over 95% cells were recovered with viability of 97.7%.

Figure 8:
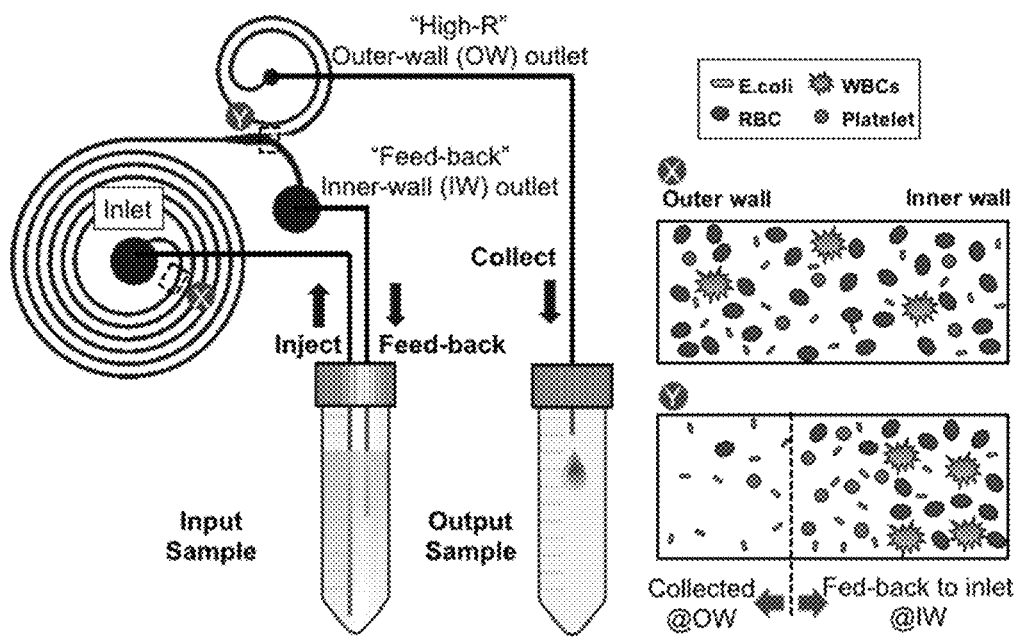
FIG. 8 shows the experimental results for isolation of bacteria using negative selection.
Figure 8:
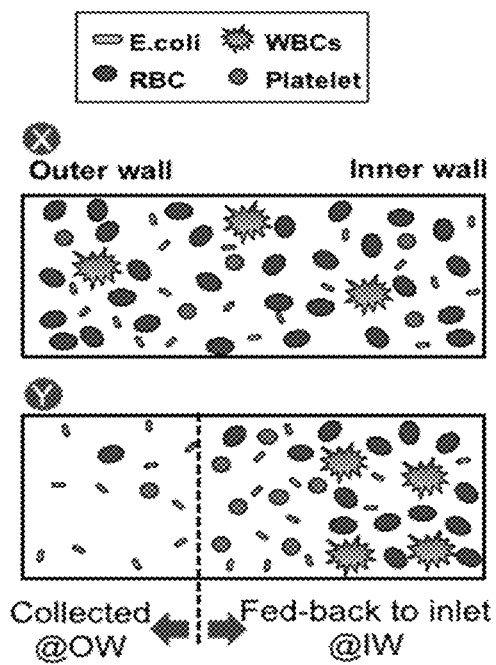
Figure 8:
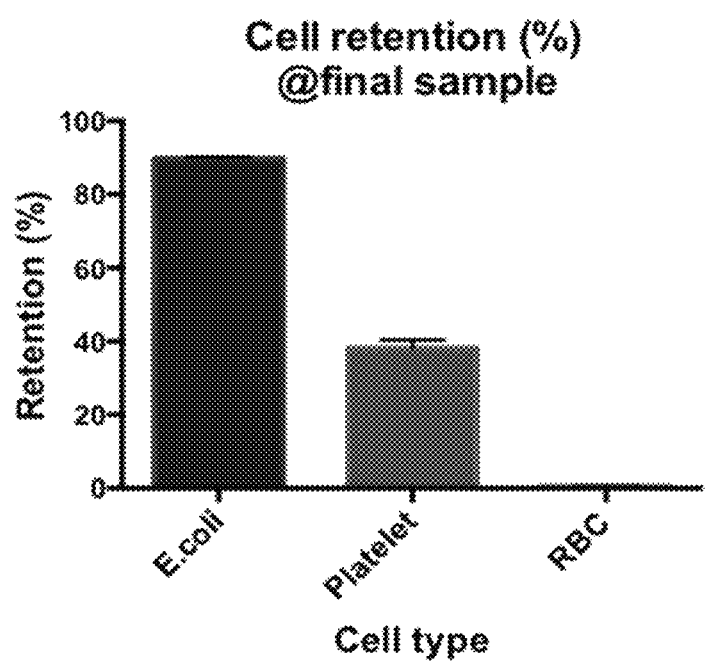
Figure 9:
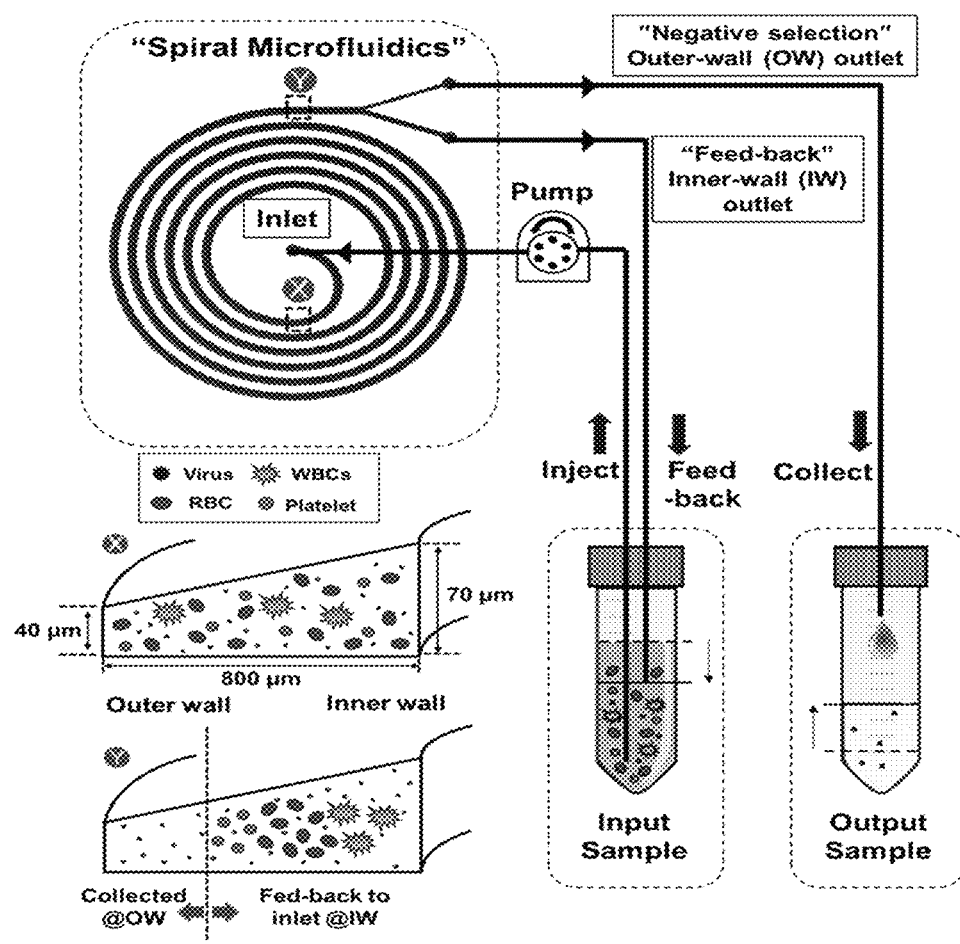
FIG. 9 shows the experimental results for isolation of virus using negative selection.
Figure 9:
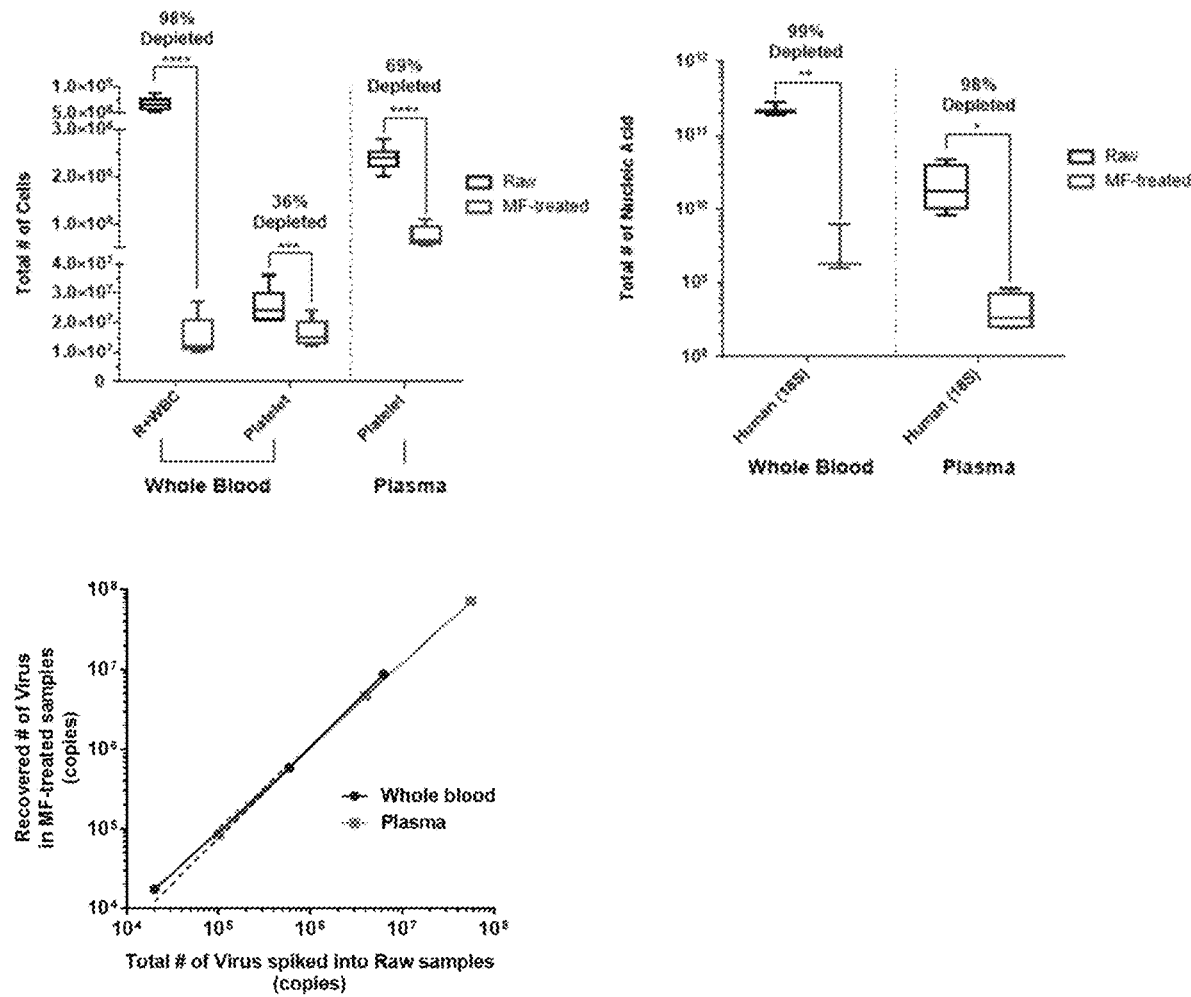

The present invention can also be used to isolate a pathogen from blood or other biofluid using negative selection. Pathogens, such as bacteria or virus in blood obtained from a patient, are usually present at low concentration (e.g., 10 bacteria in 1 mL of blood). Meanwhile, a high concentration of host cells hinders downstream assays since the host cells' nucleic acids end up giving out large, unnecessary information about host rather than the pathogens. In addition, platelets can be separated out with bacteria or virus, forming a large pellet after centrifugation. Using inertial focusing behavior, large cells including red blood cells (RBC) and white blood cells (WBC) in a patient's blood, which can interfere with identification of RNA-based pathogen diagnostics, can be removed using the systems and methods described herein. See FIGS. 8 and 9. Specifically, as shown in FIG. 8, larger cells including WBCs, RBCs and platelets are directed to the inner wall outlet whereas as *E. coli* cells are directed (by negative selection) to the outer wall outlet and collected in a reservoir (the output sample). FIG. 9 similarly shows that virus particles concentrated from whole blood and plasma samples. Specifically, virus particles are directed (by negative selection) to the outer wall outlet whereas larger cells including WBCs, RBCs, and platelets are directed to the inner wall outlet.

Figure 10:
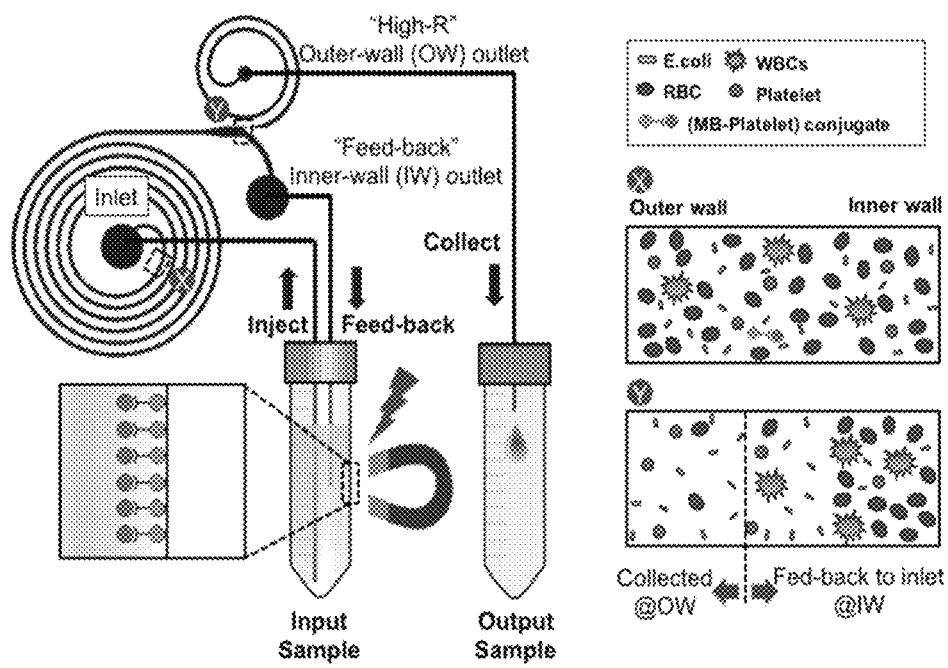
FIG. 10 shows experimental results of MACS-integrated closed-loop negative selection.
Figure 10:
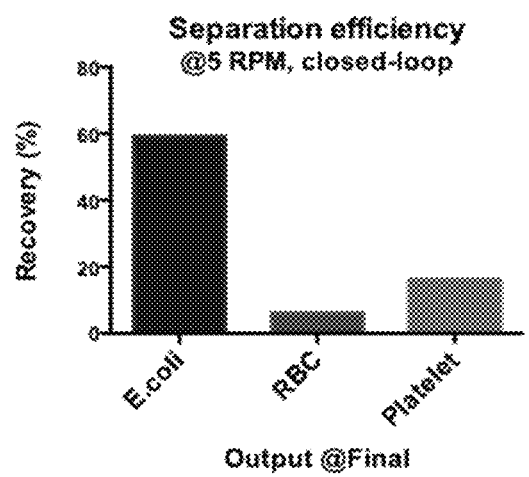
Figure 10:
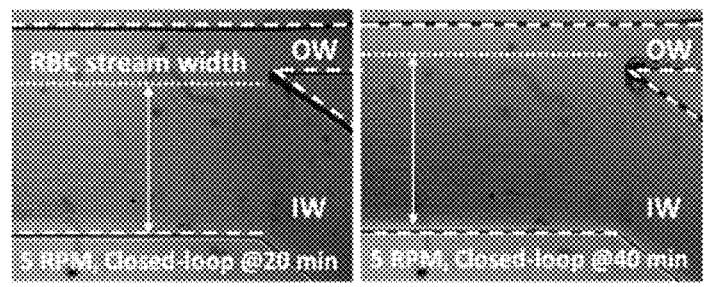

The present invention can negatively select out target cells/particles, so that their recovery is determined by the volume of sample processed, and can, in some cases, reach to greater than about 90%. Particles and/or cells which are larger than the pathogen will be focused at the inner wall loop (IWL) and separated out from the inner wall side of the output whereas the pathogen is negatively selected and collected at the outer-wall outlet. This configuration can be also integrated with affinity-based separation to further reduce the number of host cells. See, for example, FIG. 10. For example, antibody-coated magnetic beads can be used to separate specific particles/cells, such as platelets, and to enhance the purity of negatively selected pathogen in blood. In FIG. 10, the concentration of platelets in the inlet reservoir can be reduced by contacting the fluid in the inlet reservoir with antibody-coated magnetic beads and separating out the antibody-coated magnetic bead-platelet complexes. Removing platelets in this way can reduce their concentration in the negatively selected sample.

Figure 11:
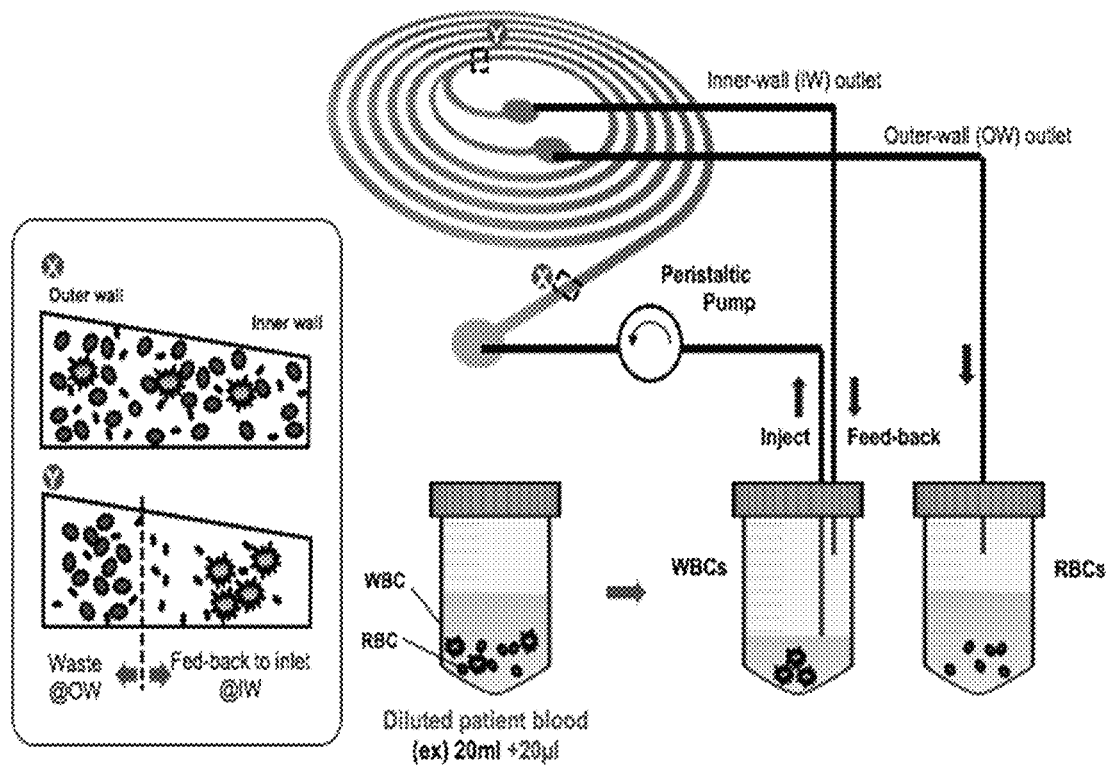
FIG. 11 shows experimental results of white blood cell (WBC) enrichment and red blood cell (RBC) removal from small amount of blood.
Figure 11:
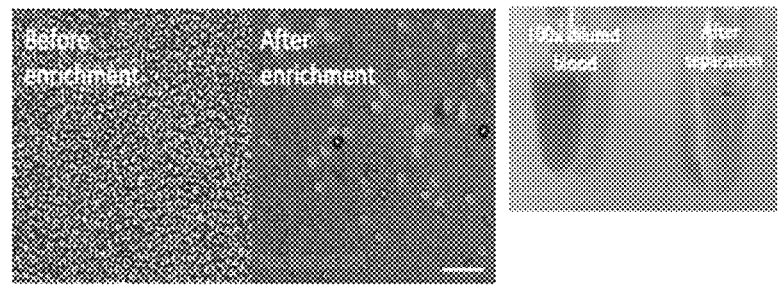
Figure 11:
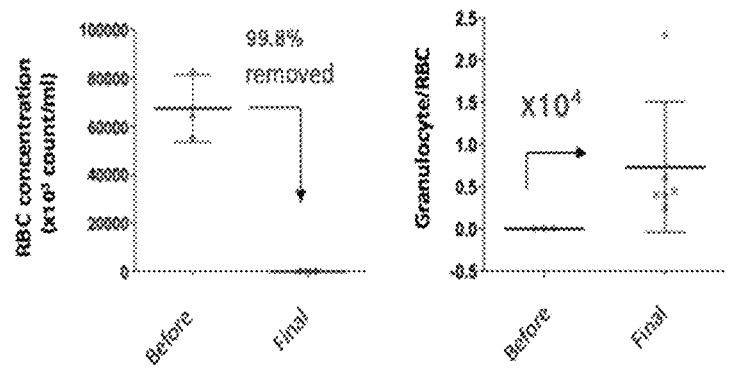

The present invention can additionally be used to enrich leukocytes from blood or other biofluid. The invention can advantageously be used to enrich leukocytes from a small volume of biofluid. As described above, the present invention can separate and concentrate particles from a large volume of fluid. A small volume of blood with a large dilution buffer can also be treated using the systems and methods describe herein. FIG. 11 shows fractionation of diluted patient blood. Spiral micro-fluidics with trapezoidal cross-section has previously been described as useful for separating WBC and RBC. The closed-loop operation of trapezoidal spiral micro-fluidics can efficiently remove RBC from large amount of diluted blood (about 100 to 1000 times dilution), and enrich leukocytes in a small volume of buffer solution. The high recovery and concentration factor provided by the present invention can be used to isolate WBCs from a blood sample, such a small volume of blood (for example, about 10 ul to about 500 ul, about 30 ul to about 300 ul, about 35 ul to about 250 ul, or about 40 ul to about 200 ul). A small volume of blood can for example, be a drop of blood from the fingertip of a patient. Compared to current RBC lysis method, we observed less neutrophil activation for the sample collected using the separation method described herein. Since the present invention permits separation using only a finger stick volume of blood (about 100 ul), a patient's immunity status could be monitored for example, by monitoring surface marker expression of neutrophil and/or by monitoring functional activity, such as neutrophil elastase degranulation and superoxide release, which are critically related to the neutrophil function. Our invention is expected to expand diagnostics capability with a less invasive sample collecting technique. In certain embodiments, the invention is directed to a method of separating red blood cells from white blood cells in a biofluid, the method comprising the steps of:
 a. introducing the biofluid into an inlet reservoir of the micro-fluidic system,
 b. directing the biofluid from the inlet reservoir into the first inlet of the first curvilinear microchannel, bifurcating the fluid into a first stream containing a first cell population to the first outlet and a second stream containing a second cell population to the second outlet; and
 c. directing the first stream to the inlet reservoir directing the second stream to the output reservoir;
 d. collecting the first cell population from the inlet reservoir and/or collecting the second cell population from the output reservoir;
wherein the curvilinear microchannel is configured to red blood cells and white blood cells from the biofluid comprising a mixture of particles; and wherein the micro-fluidic system is configured to provide a closed loop recirculation of the sample fluid through the first curvilinear microchannel. Because white blood cells are larger than red blood cells, the first cell population comprises white blood cells (for example, having a higher density of white blood cells than the second cell population) and the second cell population comprises red blood cells (for example, comprises a higher density of red blood cells than white blood cells).

The systems and methods described herein can also be used for the enrichment of nucleated cell and background fluid exchange from sputum samples. Sputum is an example of a biofluid that can be acquired by a non-invasive method. Sputum contains nucleated cells, for example, neutrophils, eosinophils, and epithelial cells, which can provide foci for advanced molecular diagnostics. However, sputum also contains mucin which can interfere with quantitative analysis. Current methods utilize chemical substances to remove mucin, however, such methods can affect WBC activity during sample preparation. Since the present invention can efficiently collect nucleated cells from a large suspension volume, nucleated cells can be enriched in highly diluted mucin-containing fluid (see, for example, FIG. 13). Nucleated cells were directed to the focusing (inner wall) side outlet and collected in the input reservoir. Mucin waste waste was directed to the outer wall side outlet and collected in the output reservoir. The nucleated cells are concentrated in the inlet reservoir and can be subjected to quantitative analysis. Using the neutrophil elastase assay, the functional aspect of neutrophil captured by closed-loop separation and conventional mucolytic method (DTT) was compared (See FIG. 14). Intact functional neutrophils which are isolated by the method described herein can be further activated by external stimuli, for example, phorbol myristate acetate (PMA). Utilizing a large volume of diluted sputum overcomes the heterogeneous physical characteristics of patient sputum and further provides a unified protocol to quantify nucleated cells. The present system and methods can be applied other biofluids that having disturbing background molecular compounds, including, but not limited, to, urine, cervical/placental fluid, semen, spinal fluid and blister.

Therefore, in certain aspects, the invention is directed to a method of isolating nucleated cells from a sputum sample comprising the steps of:
 a. introducing the sputum sample into an inlet reservoir of the micro-fluidic system,
 b. directing the sample from the inlet reservoir into the first inlet of the first curvilinear microchannel, bifurcating the fluid into a first stream containing a first cell population to the first outlet and a second stream containing a second cell population to the second outlet; wherein the first cell population comprises nucleated cells, and
 c. directing the first stream to the inlet reservoir and directing the second stream to the output reservoir;
 d. collecting the first cell population from the inlet reservoir and/or collecting the second cell population from the output reservoir;
wherein the curvilinear microchannel is configured to separate nucleated cells from a sputum sample; and wherein the micro-fluidic system is configured to provide a closed loop recirculation of the sample fluid through the first curvilinear microchannel. In certain aspects, the sputum sample is diluted prior to introduction into the inlet reservoir. In certain aspects, the nucleated cells comprise neutrophils, eosinophils, epithelial cells and/or a combination of any of thereof.

In addition, the dual closed loop micro-fluidic systems described herein can be used for buffer exchange. The exchange of background solution is one critical step in molecular functional assays to phenotype particle/cell (i.e., malignant tumor, leukocyte, bacteria, and the like). Background fluids with disturbing molecules and/or particles can interfere with the downstream assay result, for example, resulting false-positive or false-negative diagnostic results. For example, sputum from various pulmonary patients have heterogeneous proteoglycan or mucin contents which restricts quantification and molecular analysis of neutrophils, eosinophil, and other nucleated cells. The dual closed-loop platform can provide a one-step continuous pre-concentration of target cells, as well as exchange of background fluid to clear buffer solution (see, for example, FIG. 6).

In certain aspects, multiple channels can be combined into a multiplexed micro-fluidic device. For example, the first microchannel can be located on a support thereby creating a first layer and wherein a plurality of one or more additional microchannels is stacked. In certain cases, the inlets of each first micro channel of each layer are in fluid communication with the inlet reservoir and wherein the outlets of each first microchannel are in fluid communication with the output reservoir.

In yet additional aspects, the invention encompasses a device comprising a micro-fluidic system as described herein. In further embodiments, the invention includes a portable device comprising the micro-fluidic systems described. The devices can be built from relatively simple equipment, such as a miniature peristaltic pump, conical tube, control circuits and micro-fluidics (see, for example, FIG. 15) This feature provides possibility to minimize the cost as well as the size of the device and to offer cell-based diagnostics in countries, such as third world countries, which may lack certain biological equipment and/or where the diagnostic methods are needed. Using 3D printing technology and a commercially available piezo-electric pump, a deployable system which can process a patient sample in a fully automated and contained manner, can be built for low cost, for example, about 20 USD or less in price (FIG. 16). In certain aspects, the device comprises a micro-fluidic system as described herein one or more components upstream, downstream, and/or within a device. For example, the device can further comprise one or more collection devices (e.g., a reservoir), flow devices (e.g., a syringe, pump, pressure gauge, temperature gauge), analysis devices (e.g., a 96-well microtiter plate, a microscope), filtration devices (e.g., a membrane), e.g., for upstream or downstream analysis (e.g., immunostaining, polymerase chain reaction (PCR) such as reverse PCR, quantitative PCR), fluorescence (e.g., fluorescence in situ hybridization (FISH)), sequencing, and the like. In certain aspects, the device further comprises a pump, for example, one or more peristaltic pumps and/or piezoelectric pumps. An imaging system may be connected to the device, to capture images from the device, and/or may receive light from the device, in order to permit real time visualization of the isolation process and/or to permit real time enumeration of isolated cells. In one example, the imaging system may view and/or digitize the image obtained through a microscope when the device is mounted on a microscope slide. For instance, the imaging system may include a digitizer and/or camera coupled to the microscope and to a viewing monitor and computer processor.

The invention is illustrated by the following examples which are not meant to be limiting in any way.

EXEMPLIFICATION

Device Fabrication & Experimental Setup

Inertial spiral microfluidic devices were fabricated in poly-dimethylsiloxane (PDMS) using standard micro-fabrication soft-lithographic techniques described previously. The master mold with specific channel dimensions was designed using SolidWorks® software and then fabricated by micro-milling machine (Whits Technologies, Singapore) on aluminum for PDMS casting. The PDMS replica was fabricated by molding degassed PDMS (mixed in a 10:1 ratio of base and curing agent, Sylgard 184, Dow Corning Inc.) on the mold and baking in the oven for 1 hour at 90° C. The fluidic access holes were punched inside the device using Uni-Core™ Puncher (Sigma-Aldrich Co. LLC. SG) and the device was irreversibly bonded to a thick layer of plain PDMS using a plasma machine (Harrick Plasma, USA). The assembled device was finally placed inside an oven at 70° C. for 30 minutes to further enhancement of bonding strength. To efficiently and evenly deliver fluid from the sample tube to four spiral channels, 3D-printed (ProtoLab, USA) guide layer with internal fluidic channel was made, which can be inserted into PDMS device. To operate inertial spiral microfluidics device in closed-loop manner, peristaltic pump (Cole-parmer, USA) was connected to microfluidics and the sample tube through silicone tubings (Cole-parmer, USA). When the sample volume reached the target volume, the operation was stopped. Our platform could not reduce the final volume of suspension below the dead volume of channels and tubing, which results in inevitable loss on recovery.

FIG. 5: Fluorescent polystyrene particles (1 wt %) 10 μm (10.3 μm±0.4 μm) (Polysciences, Inc., USA) were diluted in buffer solution, and run through the closed-loop microfluidics operation, resulting in concentrated final suspension and background fluid.

Figure 6:
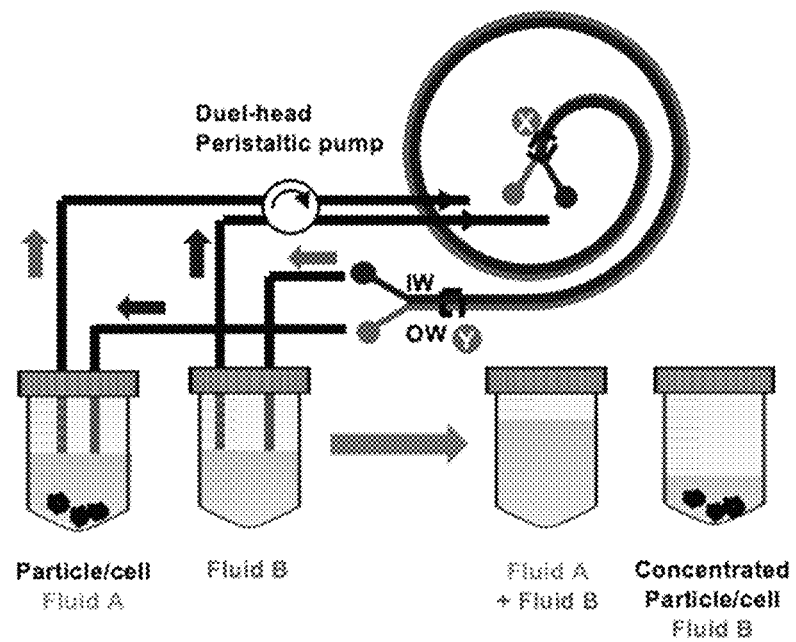
FIG. 6 shows experimental results using dual closed-loop system to concentrate cells and exchange buffer. A dual-head peristaltic pump was used to transfer glioblastoma cells (U87 cell-line) from PBS (Fluid A) to growth medium (Fluid B).
Figure 6:
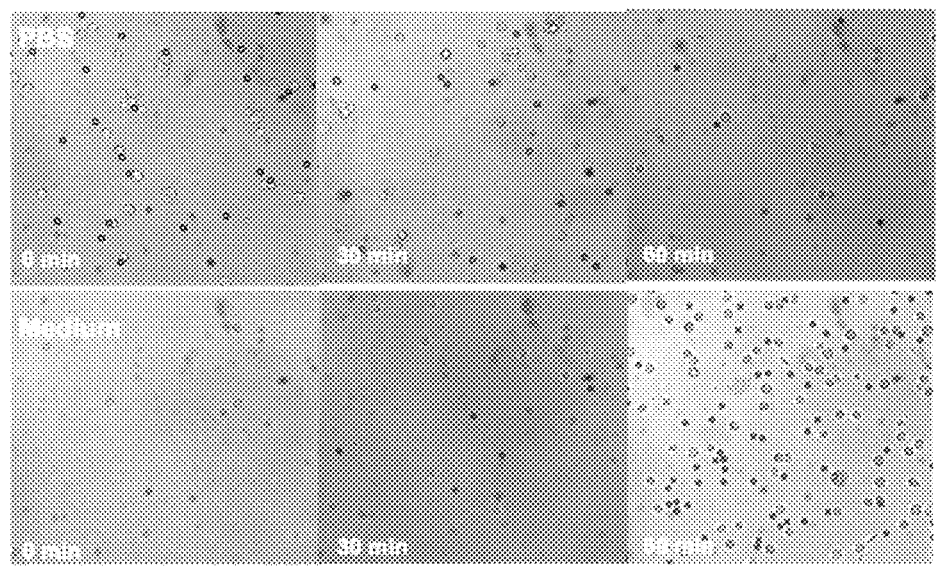

FIG. 6: Glioblastoma cell line in PBS and culture medium (DMEM with 10% FBS) run in dual closed-loop separation to exchange the background solution.

FIG. 7: The glioblastoma cell-line was diluted in culture medium with very low cell density (~10 cell/ml). Closed-loop separation recovered and concentrated viable cell from the large volume (~50 ml) of suspension.

FIGS. 8-10: Whole blood samples spiked with Bacteria and CMV were diluted in 100 times volume of buffer (phosphate-buffered saline without calcium and magnesium (PBS, CORNING®)) with 0.1% w.t. bovine serum albumin (BSA, Sigma-Aldrich) added to prevent non-specific binding of cells and particle/cell to device surface and tubing before loading onto spiral microfluidic device platform. Plasma samples were diluted in 10 times volume of the same buffer as whole blood samples. For quantification, all input and output samples were aliquoted in a volume of 100 μL and stained with 10 μL of allophycocyanin (APC)-conjugated mouse antihuman CD41a reagent (Miltenyi Biotec) for 30 minutes at 4° C. in the dark. The stained samples were then analyzed by BD Accuri C6 flow cytometer (BD Bioscience) to quantify the number of RBC/WBCs/platelets in each sample based on the number of events gated by fluorescence intensity, forward-scattering and side-scattering, accordingly. To evaluate how the amount of cells removed from the input to the output, we recorded volume numbers of each input and output sample and multiplied these volume numbers to the number of events per processed sample volume in the aliquoted samples to calculate total number of cells of each type. Human 18S rRNA was quantified by reverse-transcription quantitative polymerase chain reaction (RT-qPCR), and viral nucleic acids (CMV DNA) was quantified with quantitative polymerase chain reaction (qPCR). Viral nucleic acid was extracted using MagMax Pathogen RNA/DNA kit (ThermoFisher) per the manufacturer's instructions. CMV DNA was quantified by qPCR using Power SYBR® Green RNA-to-$C_T$™ (Applied Biosystems) with a total reaction volume of 10 μL, including 3 μL of template and 0.3 of each primer per the manufacturer's instructions. Thermocycling conditions were; 95 degrees for 10 minutes, followed by 45 cycles of 95 degrees for 15 seconds and 60 degrees for 60 seconds. Primer sequences were after Peres et al.; Forward=GAAGGTGCAGGTGCCCTG (SEQ ID NO: 1), Reverse=GTSTCGACGAACGACGTACG (SEQ ID NO: 2), Viral copies were calculated by comparison to a standard curve generated using a custom synthesized DNA fragment (G-block) of the primer-amplified region (IDT).

FIG. 9: Nucleic acid was extracted using MagMax Pathogen RNA/DNA kit (ThermoFisher) per the manufacturer's instructions. CMV DNA was quantified by qRT-PCR using Power SYBR® Green RNA-to-CT™ (Applied Biosystems) with a total reaction volume of 10 including 3 μL of template and 0.3 μL of each primer per the manufacturer's instructions. Thermocycling conditions were; 95 degrees for 10 minutes, followed by 45 cycles of 95 degrees for 15 seconds and 60 degrees for 60 seconds. Primer sequences were after Peres et al. 32; Forward=GAAGGTGCAGGTGCCCTG (SEQ ID NO: 1), Reverse=GTSTCGACGAACGAC-GTACG (SEQ ID NO: 2), Viral copies were calculated by comparison to a standard curve generated using a custom synthesized DNA fragment (G-block) of the primer-amplified region (IDT).

Figure 12:
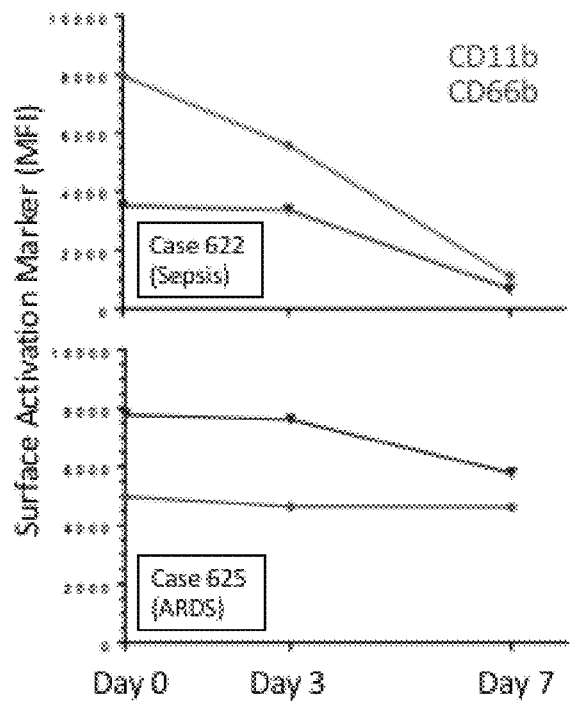
FIG. 12 is a time trace of sepsis and ARDS patient neutrophil functionalities.
Figure 12:
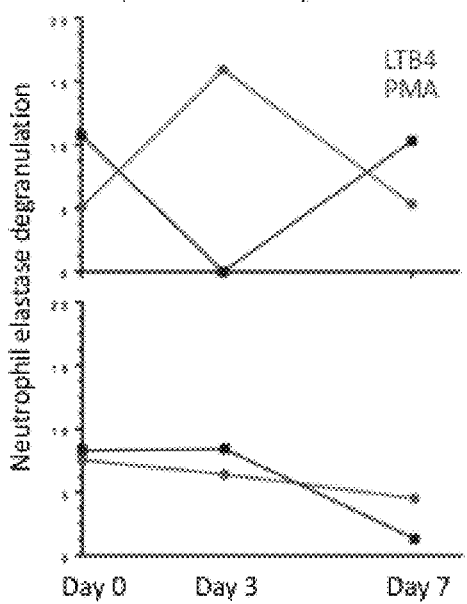
Figure 12:
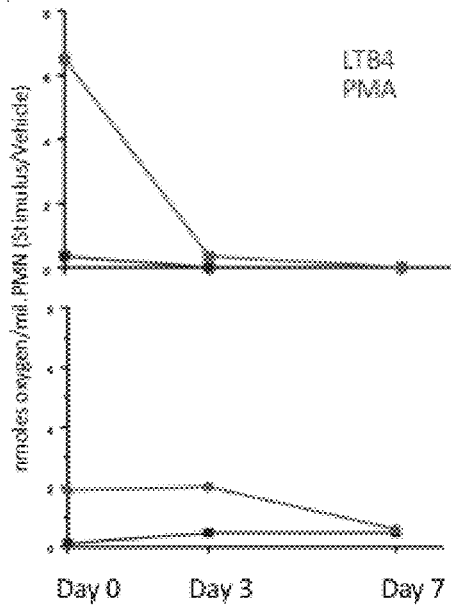

FIG. 12: Both Sepsis and ARDS patient blood was separated through closed-loop separation. At day 0, 3, and 7, 50 micro-liter of patient blood were collected and diluted in 1000-fold buffer. Resulting suspension contains Neutrophils and minor amount of RBC, which could be further analyzed by functional downstream assay, e.g. surface marker identification, degranulation, and superoxide release.

Figure 13:
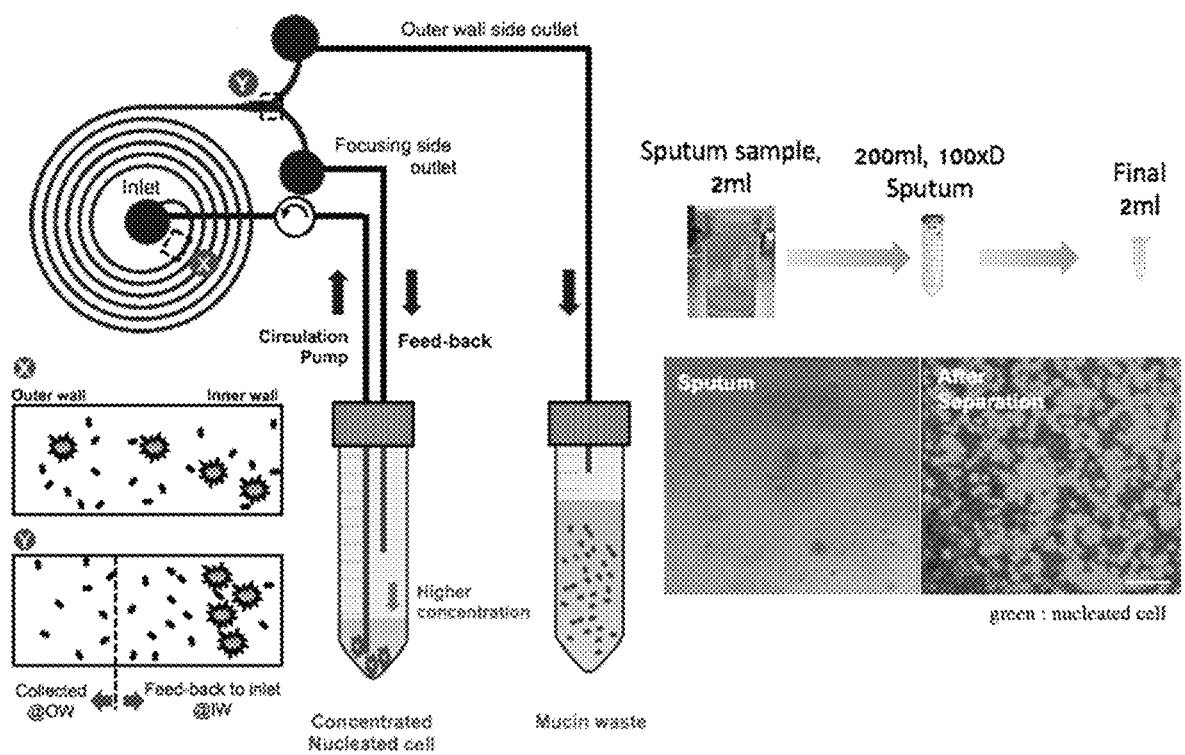
FIG. 13 shows experimental results of nucleated cell enrichment from patient sputum.

FIG. 13: All airway secretion samples were mechanically dispersed in PBS before the separation. Ten-fold diluent of each sample was dispersed 10 times volume of buffer, resulting diluent with 100-fold. Resulting suspension was stained with Calcein AM (green) to quantify the viability of neutrophil.

Figure 14:
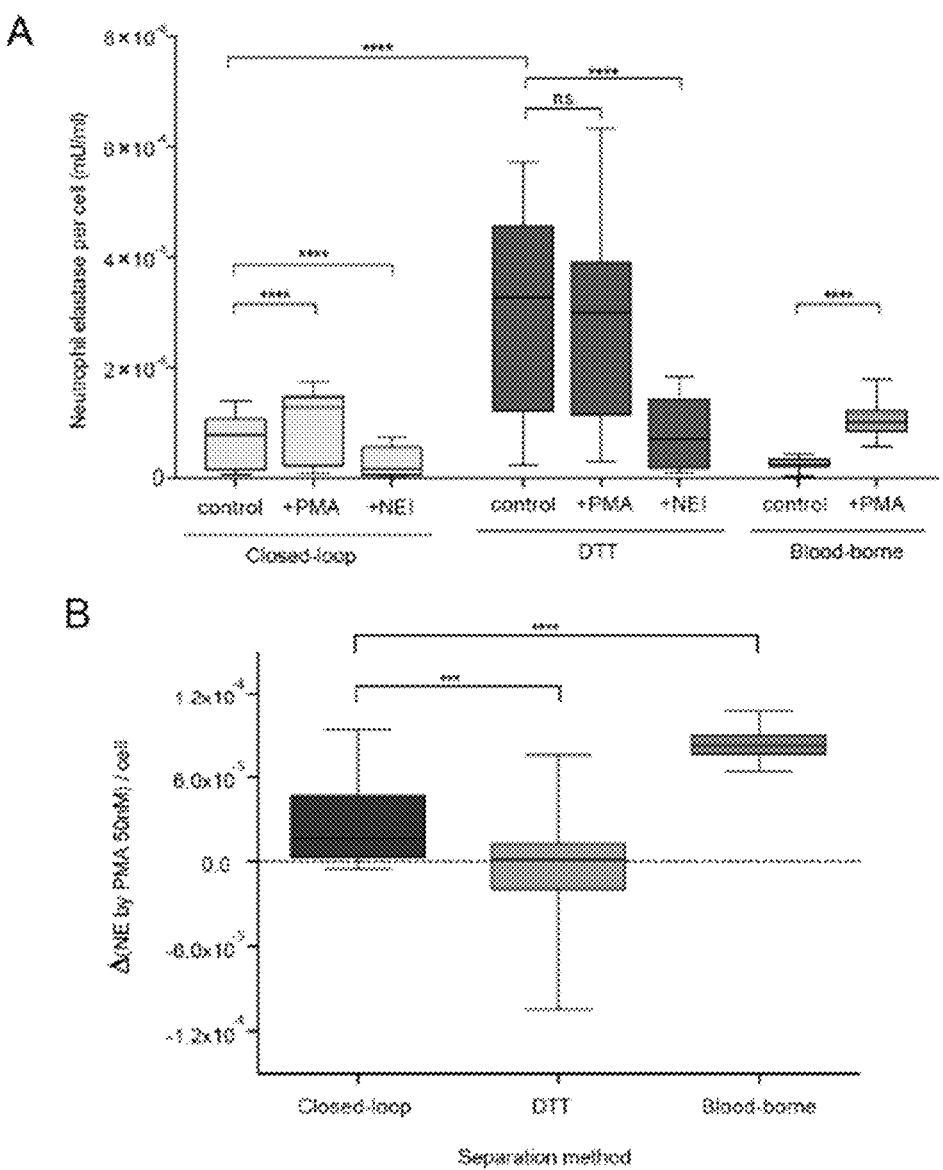
FIG. 14 shows graphs comparing neutrophil functionality between closed-loop separation method and DTT, the conventional chemical preparation method.

FIG. 14: 1000-fold diluted samples were used to perform Elastase assay comparison to DTT experiments. For DTT comparison, airway secretion samples were processed in mucolytic protocol described previously. Briefly, airway secretion sample was liquefied with 4 times volume of 6.5 mM DTT in PBS. The sample was incubated on a roller at room temperature for 15 minutes, and 4× volumes of PBS was added. The samples were filtered through 50-μm strain filter. Supernatant was aspirated after centrifugation at 400 g for 10 minutes and re-suspended in buffer solution. To compare airway PMNs to blood PMNs, fresh human whole blood from healthy donors with sodium heparin as anticoagulant was purchased from Research Blood Component, LLC (Boston, Mass., USA). Leukocyte isolated using the selective RBC lysis method were obtained by treating whole blood with RBC lysis buffer (eBioscience Inc., USA) (1:10) for 10 min, followed by washing and re-suspension in buffer solution. Whole blood was spun down at 400 g for 10 min and re-suspended in sample buffer in $10^5$ count/ml concentration to perform Elastase assay.

To compare functionality of PMNs separated by DTT homogenization and our method, a commercial Neutrophil Elastase assay kit (Caymanchem, USA) was used. PMA [50 nM] was added to each resulting suspension and incubated at 37° C. for 2 hours. At the end of treatment, each suspension was centrifuged at 1,200 rpm for 10 minutes. 10 μl of each supernatant was transferred to a 96-well plate, followed by addition of 90 μl diluted assay buffer to match the volume of standard wells. 10 μl of the Elastase substrate (Z-Ala-Ala-Ala-Ala 2Rh110) (SEQ ID NO: 3) was added and incubated for 1.5 hours at 37° C. Plate was read using a fluorometer (Varioskan plate reader, USA) at an excitation wavelength of 485 nm and an emission of 525 nm. Activity of NE was normalized by the number of PMNs measured by flow cytometry analysis. Statistical comparisons were performed by using non-parametric t-test. Statistical significance was considered at $p<0.05$.

Figure 15:
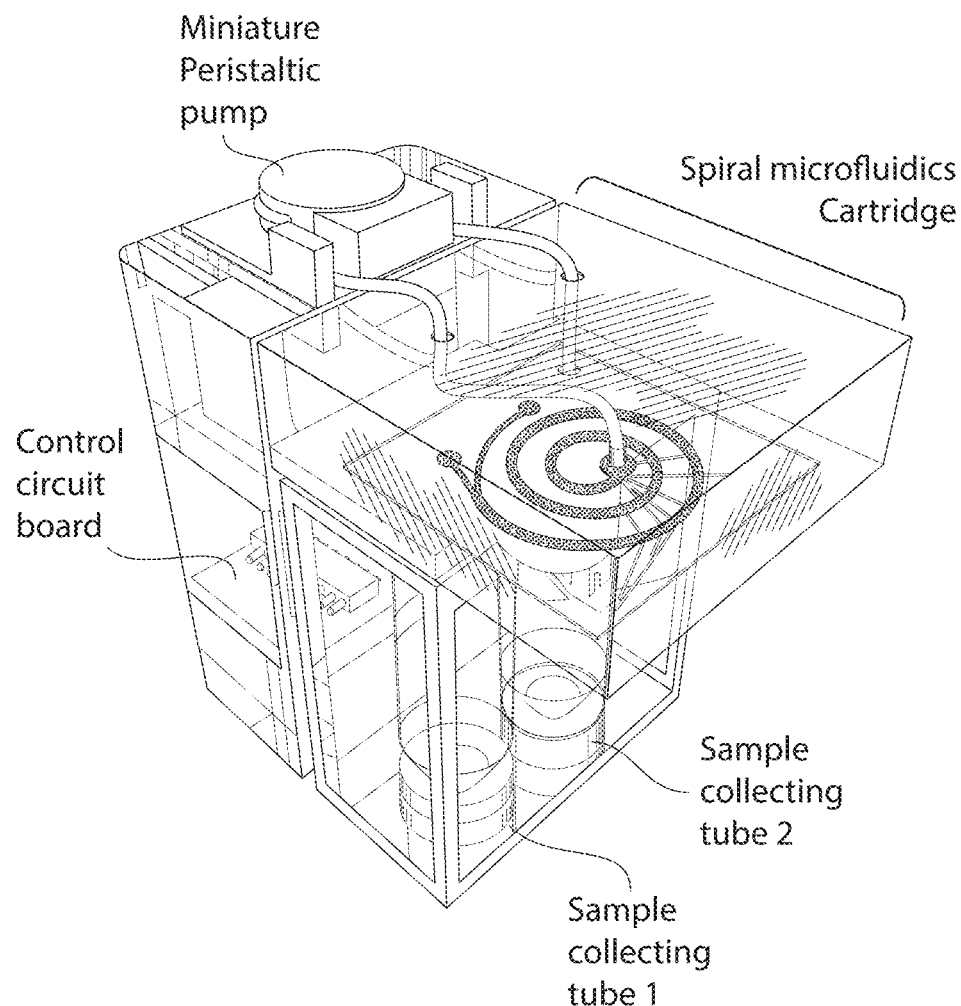
FIG. 15 is a photograph showing an example design of a portable closed-loop spiral micro-fluidics separation system.
Figure 16:
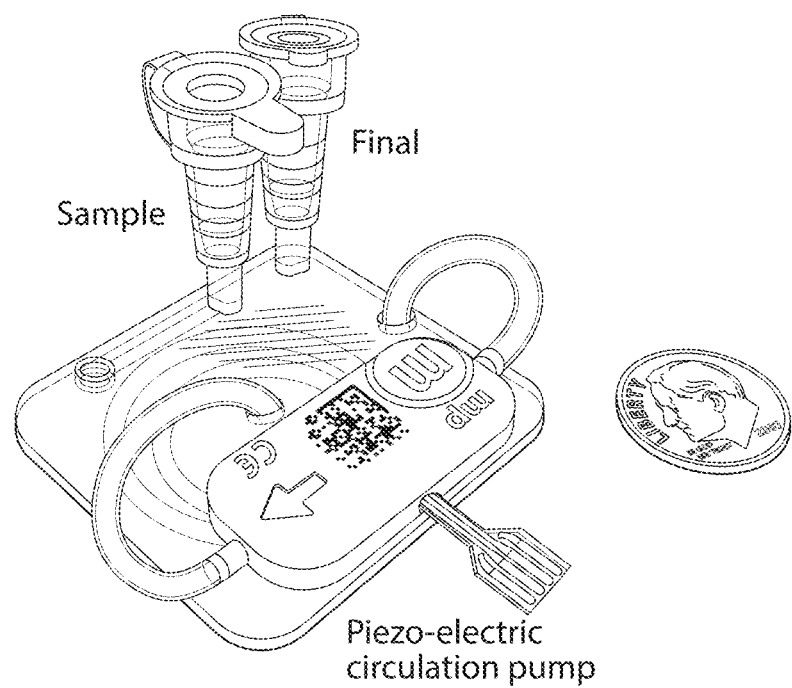
FIG. 16 is a photograph showing a portable closed-loop spiral micro-fluidics separation system made by 3D printing and mass-producible piezo-electric pump.

FIG. 15: Portable separation system was designed. Miniature peristaltic pump controlled by micro-computer (Arduino) induce flow from sample tube to the spiral microchannel within the spiral microfluidics Cartridge. One of the outlet of microfluidics is connected to one of the sample collecting tube, which enables the recirculation of particle/cell-of-interest.

FIG. 16: Spiral microchannel was 3D printed using stereo lithography. Manufacturable piezoelectric pump is connected to input of micro-channel and one of the reservoir, which provide recirculation of particle/cell-of-interest.

While this invention has been particularly shown and described with references to preferred embodiments thereof, it will be understood by those skilled in the art that various changes in form and details may be made therein without departing from the scope of the invention encompassed by the appended claims. It should also be understood that the preferred embodiments described herein are not mutually exclusive and that features from the various preferred embodiments may be combined in whole or in part in accordance with the invention.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference. The relevant teachings of all patents, published applications and references cited herein are incorporated by reference in their entirety.

REFERENCES

1. D Di Carlo et al., Proceedings of the National Academy of Sciences, 104, 18892 (2007).
2. M E Warkiani et al., Nature Protocols, 11(1), 134-148 (2016)
3. B L Khoo et al., PLoS ONE, 9(7), e99409 (2014)
4. M E Warkiani et al., Lab on a Chip, 14, 128-137 (2014)
5. H W Hou et al., Lab on a Chip, 15, 2297-2307 (2015)
6. M E Warkiani et al., Analyst, 13, 3245-3255 (2014)
7. H Ryu et al., Anal Chem, Anal. Chem., 2017, 89 (10), pp 5549-5556
8. Lim et al., WO2011/109762A1; 9 Sep. 2011
9. Birch et al., WO 2013/181615; 5 Dec. 2013
10. Han et al., WO 2014/046621 A1; 27 Mar. 2014
11. Hou et al., WO 2014/152643 A1; 25 Sep. 2014
12. Voldman et al., WO 2015/156876 A2; 15 Oct. 2015
13. Warkiani et al., WO 2016/044537 A1; 24 Mar. 2016
14. Warkiani et al., WO 2016/044555 A1; 24 Mar. 2016
15. Sarkar et al., WO 2016/077055 A1; 19 May 2016
16. Peres et al. BMC Infectious Diseases, 10, 147 (2010).

What is claimed is:

1. A micro-fluidic system comprising:
   a. At least one inlet reservoir;
   b. At least one output reservoir;
   c. A first spiral microchannel comprising a first inlet in fluid communication with an inlet reservoir, a first outlet in fluid communication with the inlet reservoir, and a second outlet in fluid communication with an output reservoir; wherein said first spiral microchannel is configured to separate particles from a sample fluid comprising a mixture of particles, wherein the first spiral microchannel has a trapezoidal cross section defined by a radially inner side, a radially outer side, a bottom side, and a top side, the cross section having i) the radially inner side and the radially outer side unequal in height, or ii) the radially inner side equal in height to the radially outer side, and wherein the top side has at least two continuous straight sections, each unequal in width to the bottom side;
   wherein the micro-fluidic system is configured to provide a closed loop recirculation of the sample fluid through the first spiral microchannel.

2. The micro-fluidic system of claim 1, wherein the spiral microchannel comprises at least 2 loops.

3. The micro-fluidic system of 1, claim wherein the first spiral microchannel further comprises a second inlet in fluid communication with a second inlet reservoir.

4. The micro-fluidic system of claim 1, wherein the first spiral microchannel cross section has (a) the height of the radially inner side larger than the height of the radially outer side, or (b) the height of the radially inner side is smaller than the height of the radially outer side, or (c) the top side includes at least one step forming a stepped profile, or (d) the top side includes at least one shallow region in between the radially inner side and the radially outer side.

5. The micro-fluidic system of claim 1, wherein the first spiral microchannel has a right trapezoidal cross section.

6. The micro-fluidic system of claim 1, wherein the top side of the first spiral microchannel cross section is curved.

7. The micro-fluidic system of claim 1, wherein the bottom side of the first spiral microchannel cross section is curved.

8. The micro-fluidic system of claim 1, wherein the radially inner side of the first spiral microchannel cross section has a height between about 20 microns and about 200 microns, and wherein the radially outer side of the first spiral microchannel cross section has a height between about 20 microns and about 200 microns.

9. The micro-fluidic system of claim 1, wherein the bottom side of the first spiral microchannel cross section has a width between about 100 microns and about 2000 microns, and wherein the top side of the first spiral microchannel cross section has a width between about 100 microns and about 2000 microns.

10. The micro-fluidic system of claim 1, wherein the first spiral microchannel has a radius of curvature between about 2.5 mm and about 25 mm.

11. The micro-fluidic system of claim 1, wherein the first spiral microchannel has a length between about 4 cm and about 100 cm.

12. The micro-fluidic system of claim 1, further comprising a second spiral microchannel disposed between (a) the first outlet of said first spiral microchannel and the inlet reservoir and in fluid communication therewith, (b) the second outlet of said first spiral microchannel and the output reservoir and in fluid communication therewith, or (c) the output reservoir and the inlet reservoir and in fluid communication therewith.

13. The micro-fluidic system of claim 12, wherein the second spiral microchannel is disposed between the output reservoir and the inlet reservoir and in fluid communication therewith.

14. The micro-fluidic system of claim 12, wherein the second spiral microchannel has a non-rectangular cross section.

15. The micro-fluidic system of claim 14, wherein the second spiral microchannel has a trapezoidal cross section defined by a radially inner side, a radially outer side, a bottom side, and a top side, the cross section having a) the radially inner side and the radially outer side unequal in height, or b) the radially inner side equal in height to the radially outer side, and wherein the top side has at least two continuous straight sections, each unequal in width to the bottom side.

16. The micro-fluidic system of claim 15, wherein the second spiral microchannel cross section has (a) the height of the radially inner side larger than the height of the radially outer side, or (b) the height of the radially inner side is smaller than the height of the radially outer side, or (c) the top side includes at least one step forming a stepped profile, or (d) the top side includes at least one shallow region in between the radially inner side and the radially outer side.

17. The micro-fluidic system of claim 14, wherein the second spiral microchannel has a right trapezoidal cross section.

18. The micro-fluidic system of claim 1, wherein the first inlet of the first spiral microchannel is the only inlet of the first spiral microchannel.

19. The micro-fluidic system of claim 1, wherein the first spiral microchannel comprises a second inlet, wherein the second inlet is in fluid communication with a reservoir other than the inlet reservoir.

20. The micro-fluidic system of claim 1, wherein the first spiral microchannel further comprises a second inlet, wherein the second inlet is in fluid communication with the output reservoir.

21. The method of claim 20, wherein the output reservoir comprises a second background fluid, wherein the second background fluid is different from that of the sample fluid.

22. The micro-fluidic system of claim 1, wherein the first inlet is the only inlet of the first spiral microchannel and the first inlet is on the interior of the spiral microchannel.

23. The micro-fluidic system of claim 1, wherein the first and second outlets are on the circumference of the spiral microchannel.

24. The micro-fluidic system of claim 1, wherein the first inlet is the only inlet of the first spiral microchannel and the first inlet is on the circumference of the spiral microchannel.

25. The micro-fluidic system of claim 1, wherein the first and second outlets are on the interior of the spiral microchannel.

26. The micro-fluidic system of claim 1, wherein at least one of the first and second outlets is located on the radially inner side of the first spiral microchannel.

27. The micro-fluidic system of claim 1, wherein at least one of the first and second outlets is located on the radially outer side of the first spiral microchannel.

28. The micro-fluidic system of claim 1, further comprising a pump configured to pump fluid from the inlet reservoir to the first inlet of the first spiral microchannel.

29. The micro-fluidic system of claim 1, wherein the first spiral microchannel is located on a support thereby creating a first layer and wherein a plurality of such layers is stacked.

30. A method of separating particles from a sample fluid comprising a mixture of particles comprising the steps of:
  a. introducing the sample fluid into the inlet reservoir of the micro-fluidic system according to claim 1,
  b. directing the sample fluid from the inlet reservoir into the first inlet of the first spiral microchannel, bifurcating the fluid into a first stream containing first particle population to the first outlet and a second stream containing a second particle population to the second outlet, and
  c. directing the first stream to the inlet reservoir and directing the second stream to the output reservoir.

31. A method of separating particles from a sample fluid comprising a mixture of particles comprising the steps of:
  a. Introducing the fluid into the inlet reservoir of the micro-fluidic system of claim 13;
  b. Directing the fluid from the inlet reservoir into the first inlet of the first spiral microchannel, bifurcating the fluid into a first stream containing the first particle population to the first outlet of the first spiral microchannel and a second stream containing a second particle population to the second outlet of the first spiral microchannel,
  c. Directing the first stream back to the inlet reservoir,
  d. Directing the second stream to the output reservoir to form a second fluid, wherein the output reservoir is in fluid communication with the second spiral microchannel;
  e. Directing the second fluid to the inlet of the second spiral microchannel, bifurcating the second fluid into a first secondary stream containing the first particle population to the first outlet of the second spiral microchannel and a second secondary stream containing the second particle population to the second outlet of the second spiral microchannel;
  f. Directing the second secondary stream back to the output reservoir;
  g. Directing the first secondary stream to the input reservoir.

32. A method of separating particles from a sample fluid comprising a mixture of particles and suspending the separated particles in a second background fluid, wherein the second background fluid is different from that of the sample fluid, the method comprising the steps of:
  a. Introducing the first fluid into the inlet reservoir of the micro-fluidic system of claim 21;
  b. Directing the fluid from the inlet reservoir into the first inlet of the first spiral microchannel, bifurcating the fluid into a first stream containing the first particle population to the first outlet of the first spiral microchannel and a second stream containing a second particle population to the second outlet of the first spiral microchannel,
  c. Directing the first stream back to the inlet reservoir,
  d. Directing the second stream to the output reservoir,
  e. Directing the second stream in the output reservoir to the second inlet of the first spiral microchannel.

33. A method of concentrating particles from a sample fluid comprising a mixture of particles comprising the steps of:
  a. introducing the fluid into the inlet reservoir of the micro-fluidic system according to claim 1,
  b. directing the fluid comprising the mixture of particles from the inlet reservoir into the first inlet of the first spiral microchannel, bifurcating the fluid into a first stream containing a first particle population to the first outlet and a second stream containing a second particle population to the second outlet, and
  c. directing the first stream to the inlet reservoir to form a concentrated fluid and directing the second stream to the output reservoir;

wherein the concentrated fluid has higher concentration of the first particle population compared to the concentration of the first particle population in the sample fluid.

34. A device comprising the micro-fluidic system of claim 1.

35. The device of claim 34, wherein the device is portable.

* * * * *